US012242292B2

(12) United States Patent
Kasina et al.

(10) Patent No.: US 12,242,292 B2
(45) Date of Patent: *Mar. 4, 2025

(54) CIRCUIT FOR OUTPUTTING A STEPDOWN VOLTAGE AND METHOD FOR STEPPING DOWN A VOLTAGE

(71) Applicant: Taiwan Semiconductor Manufacturing Company, Ltd., Hsinchu (TW)

(72) Inventors: Bindu Madhavi Kasina, Hsinchu (TW); Szu-Chun Tsao, Hsinchu (TW); Jaw-Juinn Horng, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,587

(22) Filed: Jun. 20, 2023

(65) Prior Publication Data

US 2023/0350442 A1 Nov. 2, 2023

Related U.S. Application Data

(63) Continuation of application No. 17/458,723, filed on Aug. 27, 2021, now Pat. No. 11,726,510.

(51) Int. Cl.
*G05F 1/46* (2006.01)

(52) U.S. Cl.
CPC .............. *G05F 1/468* (2013.01); *G05F 1/461* (2013.01)

(58) Field of Classification Search
CPC .......... G05F 1/461; G05F 1/468; G05F 1/563; G05F 1/565
See application file for complete search history.

(56) References Cited

U.S. PATENT DOCUMENTS

| | | | | |
|---|---|---|---|---|
| 6,518,737 | B1 * | 2/2003 | Stanescu | G05F 1/575 323/280 |
| 2009/0167423 | A1 * | 7/2009 | Chiu | G05F 1/575 327/543 |
| 2010/0141223 | A1 * | 6/2010 | Wadhwa | G05F 1/563 323/280 |

(Continued)

OTHER PUBLICATIONS

Yang et al., A 65nm Inverter-Based Low-Dropout Regulator with Rail-to-Rail Regulation and over—20dB PSR at 0.2V Lowest Supply Voltage, 2017, IEEE Xplore, p. 106-108 (Year: 2017).*

(Continued)

*Primary Examiner* — Jue Zhang
*Assistant Examiner* — Lakaisha Jackson
(74) *Attorney, Agent, or Firm* — Jones Day

(57) ABSTRACT

Systems and methods as described herein may take a variety of forms. In an example, a circuit includes a first voltage stepdown module and a second voltage stepdown module. The first voltage stepdown module has a supply voltage and a first reference voltage as inputs, and an intermediate stepped down voltage as an output, the intermediate stepped down voltage being electrically coupled to a feedback input of the first voltage stepdown module. The second voltage stepdown module includes a low-dropout voltage regulator having the intermediate stepped down voltage and a second reference voltage as inputs and a target voltage as an output.

20 Claims, 16 Drawing Sheets

(56) References Cited

U.S. PATENT DOCUMENTS

| | | | | |
|---|---|---|---|---|
| 2010/0237931 | A1* | 9/2010 | Ogiwara | G05F 1/56 327/536 |
| 2019/0317536 | A1* | 10/2019 | Liu | G05F 1/467 |

OTHER PUBLICATIONS

Yang et al., A 65nm Inverter-Based Low-Dropout Regulator with Rail-to-Rail Regulation and over—20dB PSR and 0.2V Lowest Supply Voltage, IEEE Xplore, pp. 106-108; 2017.

* cited by examiner

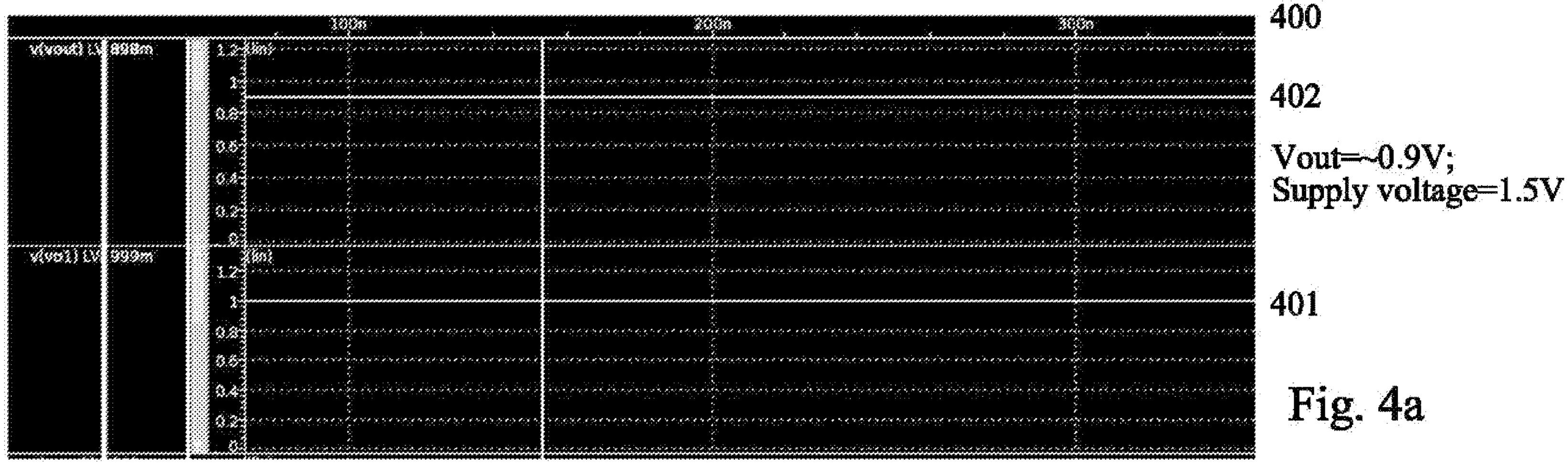
400
402
Vout=~0.9V;
Supply voltage=1.5V
401
Fig. 4a
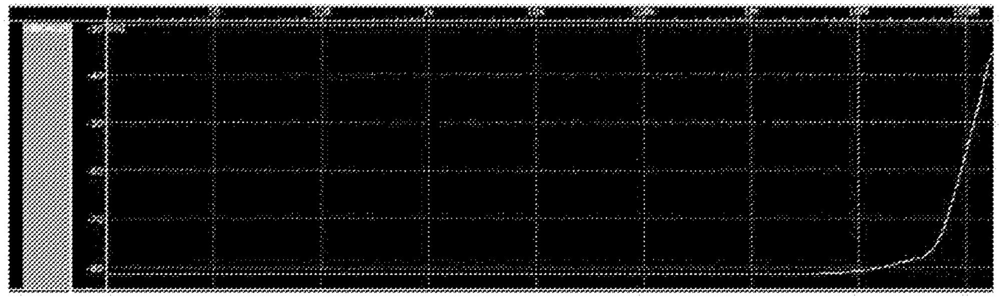
410
Fig. 4b
| LDO type | | PSRR@1KHz | | PSRR@10MHz | |
|---|---|---|---|---|---|
| Conventional LDO | 420 | -69dB | 421 | -55dB | 422 |
| 2-level LDO (conventional) | 423 | -81dB | 424 | -80dB | 425 |
Fig. 4c Vout=~0.9V; Supply voltage=1.5V PSRR@100kHz= ~71dB
PSRR@10MHz= ~ 50dB

CIRCUIT FOR OUTPUTTING A STEPDOWN VOLTAGE AND METHOD FOR STEPPING DOWN A VOLTAGE

CROSS-REFERENCE TO RELATED APPLICATION

This is a continuation application of U.S. patent Application Ser. No. 17/458,723, filed Aug. 27, 2021, which is incorporated herein by reference in its entirety.

BACKGROUND

A low-dropout regulator (LDO) is a DC linear voltage regulator that can regulate the output voltage even when the supply voltage is very close to the output voltage.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 4*a* depicts an example performance of an LDO circuit stepping down a supply voltage input to a desired output, in accordance with some embodiments.

FIG. 4*b* depicts an example power supply rejection ratio (PSRR) performance of an LDO circuit stepping down a supply voltage input to a desired output across a range of frequencies, in accordance with some embodiments.

FIG. 4*c* depicts an example PSRR performance of an LDO circuit stepping down a supply voltage input to a desired output at 10 MHz in comparison to the performance of a conventional 2-stage LDO, in accordance with some embodiments.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
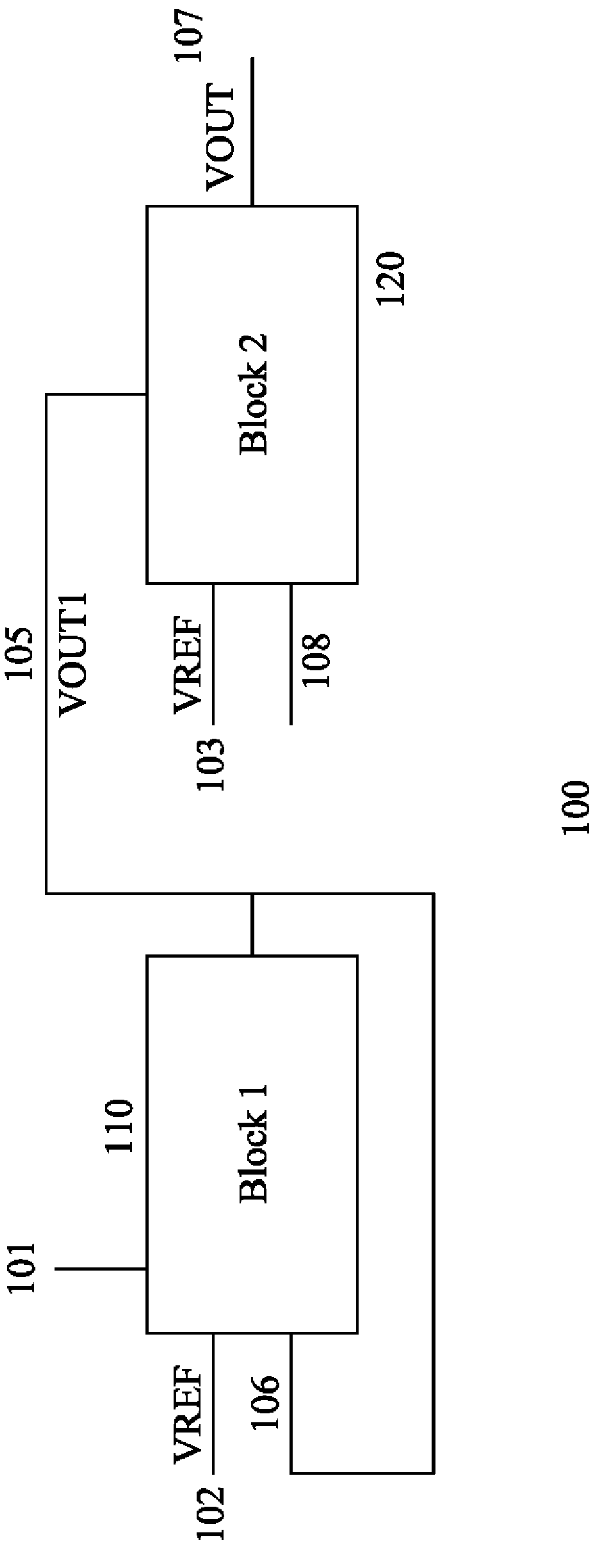
FIG. 1 depicts a block diagram of a circuit for stepping down an input supply voltage in two stages, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in some various examples. This repetition is for the purpose of simplicity and clarity and does not in itself dictate a relationship between some various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some embodiments of the disclosure are described. Additional operations can be provided before, during, and/or after the stages described in these embodiments. Some of the stages that are described can be replaced or eliminated for different embodiments. Additional features can be added to the circuit. Some of the features described below can be replaced or eliminated for different embodiments. Although some embodiments are discussed with operations performed in a particular order, these operations may be performed in another logical order.

Low-dropout regulator circuits are DC linear voltage regulators, which step down a relatively high input voltage to a lower desired voltage for a particular application. An important aspect of LDOs is power supply rejection ratio (PSRR), which is a measure of noise reduction applied by an LDO to its output voltage in relation to an input supply voltage. A higher PSRR denotes a higher degree of noise reduction from an input voltage of an LDO to its output voltage.

Stepping down a relatively high input voltage to a lower desired voltage can present challenges. For example, use of a diode connected MOSFET to step down a supply voltage to an intermediate voltage level to be stepped down by an LDO may require use of a very large diode connected MOSFET to obtain a necessary voltage drop between the supply voltage and an intermediate input voltage to the LDO. This could result in a low PSRR obtained by the circuit, meaning an output voltage of the LDO may have a higher noise ratio than desired due to the lack of noise reduction provided by the circuit. As another example, relatively large supply voltages, especially voltages above 1.2 volts, can cause reliability issues for components of the circuit and result in device burnout, shortened device life, and unreliable device performance.

Systems and methods as described herein enable, in embodiments, one or more of the regulation of a relatively high supply voltage while providing a high PSRR, fast transient response, and reduction in reliability issues caused by high voltage drops and device burnout. Systems and methods herein may utilize a multi-level LDO implementation, which achieves voltage drops in gradual stages across multiple LDOs, resulting in better and more precise control of intermediate and overall voltage drops across the device while subjecting components to lower voltage differences, resulting, in embodiments, in less device burnout, better reliability and performance, safer and more accurate operation and greater device lifespan.

FIG. 1 depicts a block diagram of a circuit for stepping down an instant supply voltage in two stages, in accordance with some embodiments. FIG. 1 depicts a multiple stage LDO 100 with a supply voltage 101 and an output voltage 107, in accordance with some embodiments. As seen in the figure, some embodiments of the multiple stage LDO 100 have a first stage 110 and a second stage 120, although other numbers of stages (e.g., two or more) may be utilized. The first stage 110 receives the supply voltage 101 as an input along with a first stage reference voltage 102 and a first stage feedback voltage 106. The first stage 110 then outputs an intermediate stepped down voltage 105, which is input to the second stage 120 as an input supply voltage. The intermediate stepdown voltage 105 is also electrically coupled to the first stage feedback voltage 106, which the first stage 110 uses to measure the intermediate stepped down voltage 105 and regulate a voltage drop between the input supply voltage 101 and the intermediate stepped down voltage 105.

The second stage 120 receives the intermediate stepped down voltage 105 as an input along with a reference voltage 103, and a second stage feedback voltage 108, and outputs a desired target stepped down output voltage 107. In some embodiments, the second stage feedback voltage 108 is proportionally related to the output voltage 107, which the second stage 120 measures to regulate a voltage drop between the intermediate stepdown voltage 105 and the output voltage 107.

In some embodiments, the stages are divided in a way such that all devices have less than a 0.9 volt bias, with no transistor experiencing more than a 0.9 volt difference across any two of its terminals. This configuration prevents or lessens device burnout, increasing lifespan and reliability of devices in the circuit. Additionally, some embodiments provide a high PSRR and a high degree of voltage control through multiple stages because the output voltage 107 is not connected directly to the input supply voltage 101.

Figure 2A:
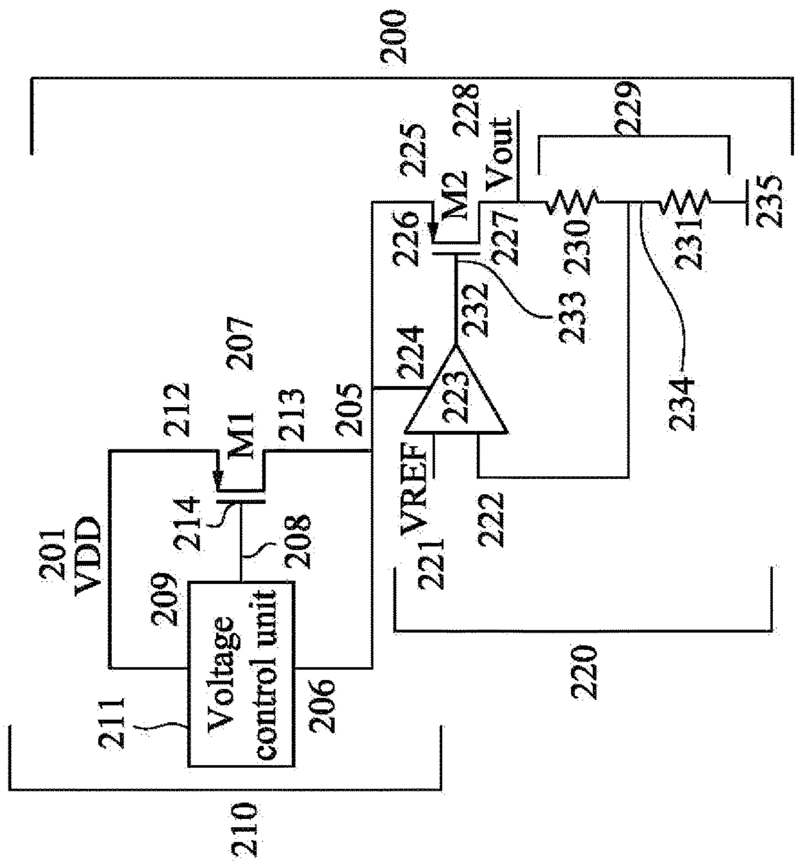
FIG. 2*a* depicts a schematic of a circuit for stepping down an input supply voltage in two stages, in accordance with some embodiments.

FIG. 2*a* depicts a schematic of a circuit 200 for stepping down an input voltage 201 in two stages, wherein a first stage 210 steps down the voltage 201 using a voltage control unit 209 and a transistor 207, and a second stage 220 steps down an intermediate voltage 205 again to a desired output voltage 228, in accordance with some embodiments. In some embodiments, the first stage 210 receives the input supply voltage 201 and a reference voltage 211 as inputs.

A transistor 207 receives the input supply voltage 201. In some embodiments, the transistor 207 is a PMOS transistor with supply 212 electrically coupled to the input supply voltage 201, gate 214 electrically coupled to a control signal 208 output by the voltage control unit 209, and drain 213, which outputs the intermediate stepdown voltage 205.

The voltage control unit 209 receives the input supply voltage 201, the reference voltage 211 and a feedback voltage 206 electrically coupled to the intermediate stepdown voltage 205. The voltage control unit 209 outputs a control signal 208 based on the voltages it received as inputs to step down the intermediate stepdown voltage 205 to a desired level. The control signal 208 is electrically coupled to the gate 214 of the transistor 207 to control the intermediate stepdown voltage 205. In some embodiments, the intermediate stepdown voltage 205 is stepped down to a level relatively close to the desired target output voltage 228, which can provide better device performance and longevity. In some embodiments, the intermediate stepdown voltage 205 is targeted to be 0.1 volts to 0.2 volts greater than the desired target output voltage 228.

In some embodiments, the second stage 220 is an LDO, as depicted in FIG. 2*a* with the intermediate stepdown voltage 205 and second stage reference voltage 221 as inputs and the desired target output voltage 228 as the output. In some embodiments, the second stage LDO 220 has an operational amplifier 223, and a transistor 225. In some embodiments, the second stage 220 also has a voltage divider 229 that includes resistors 230, 231. In some embodiments, the transistor 225 is a PMOS transistor with a source 226, a gate 233, and a drain 227. The transistor 225 receives the intermediate stepdown voltage 205 and outputs the desired target output voltage 228. The transistor 225 has a gate 233 electrically coupled to an output 232 of the operational amplifier 223 to control a voltage level of the target desired output voltage 228. In some embodiments, in which transistor 225 is a PMOS transistor, the intermediate stepdown voltage 205 is electrically coupled to source terminal 226 and the desired target output is electrically coupled to drain terminal 227.

The operational amplifier 223 receives a high voltage rail input 224 electrically coupled to the intermediate stepdown voltage 205. The operational amplifier receives a reference voltage 221 as an input and a feedback input 222 proportionately related to the desired target output voltage 228. In some embodiments, the feedback input 222 is electrically coupled to a divided voltage output 234 of a voltage divider 229, which has the desired target output voltage 228 as a high voltage input and a ground 235 as a low voltage input. The operational amplifier 223 uses these inputs and the feedback voltage 222 to control the desired target voltage 228 of the circuit.

Figure 2B:
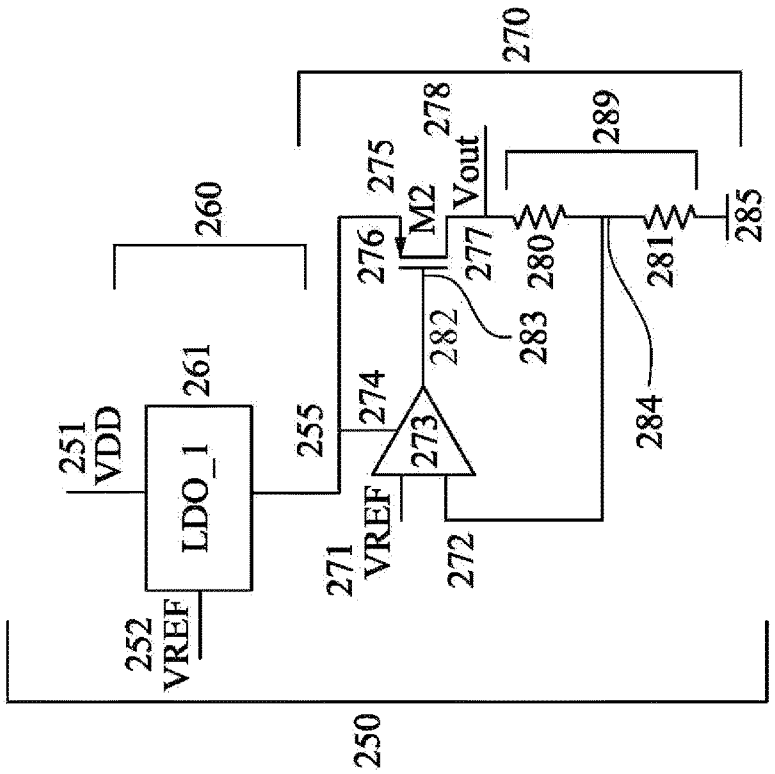
FIG. 2*b* depicts a schematic of a circuit for stepping down a voltage in two stages, in accordance with some embodiments.

FIG. 2*b* depicts another example schematic of a circuit 250 for stepping down an input supply voltage in two stages, wherein a first stage 260 steps down the input supply voltage using a first LDO 261, and a second stage 270 steps down an intermediate stepped down voltage 255 to a desired target output voltage 278, in accordance with some embodiments. In some embodiments, an LDO 261 is used to step down the input supply voltage 251 to intermediate stepdown voltage 255 with a second input of a first stage reference voltage 252.

In some embodiments, the second stage 270 is an LDO, as depicted in FIG. 2*b* with the intermediate stepdown voltage 255 and second stage reference voltage 271 as inputs and the desired target output voltage 278 as the output. In some embodiments, the second stage LDO 270 has an operational amplifier 273, and a transistor 275. In some embodiments, the second stage 270 also has a voltage divider 289 that includes resistors 280, 281. In some embodiments, the transistor 275 is a PMOS transistor with a source 276, a gate 283, and a drain 277. The transistor 275 receives the intermediate stepdown voltage 255 and outputs the desired target output voltage 278. The transistor 275 has a gate 283 electrically coupled to an output 282 of the operational amplifier 273 to control a voltage level of the target desired output voltage 278. In some embodiments, in which transistor 275 is a PMOS transistor, the intermediate stepdown voltage 255 is electrically coupled to source terminal 276 and the desired target output voltage 278 is electrically coupled to drain terminal 277.

The operational amplifier 273 receives a high voltage rail input 274 electrically coupled to the intermediate stepdown voltage 255. The operational amplifier 273 receives a reference voltage 271 as an input and a feedback input 272 proportionately related to the desired target output voltage 278. In some embodiments, the feedback input 272 is electrically coupled to a divided voltage output 284 of a voltage divider 289, which has the desired target output voltage 278 as a high voltage input and a ground 285 as a low voltage input. The operational amplifier 273 uses these inputs and the feedback input 272 to control the desired target voltage 278 of the circuit.

Figure 3:
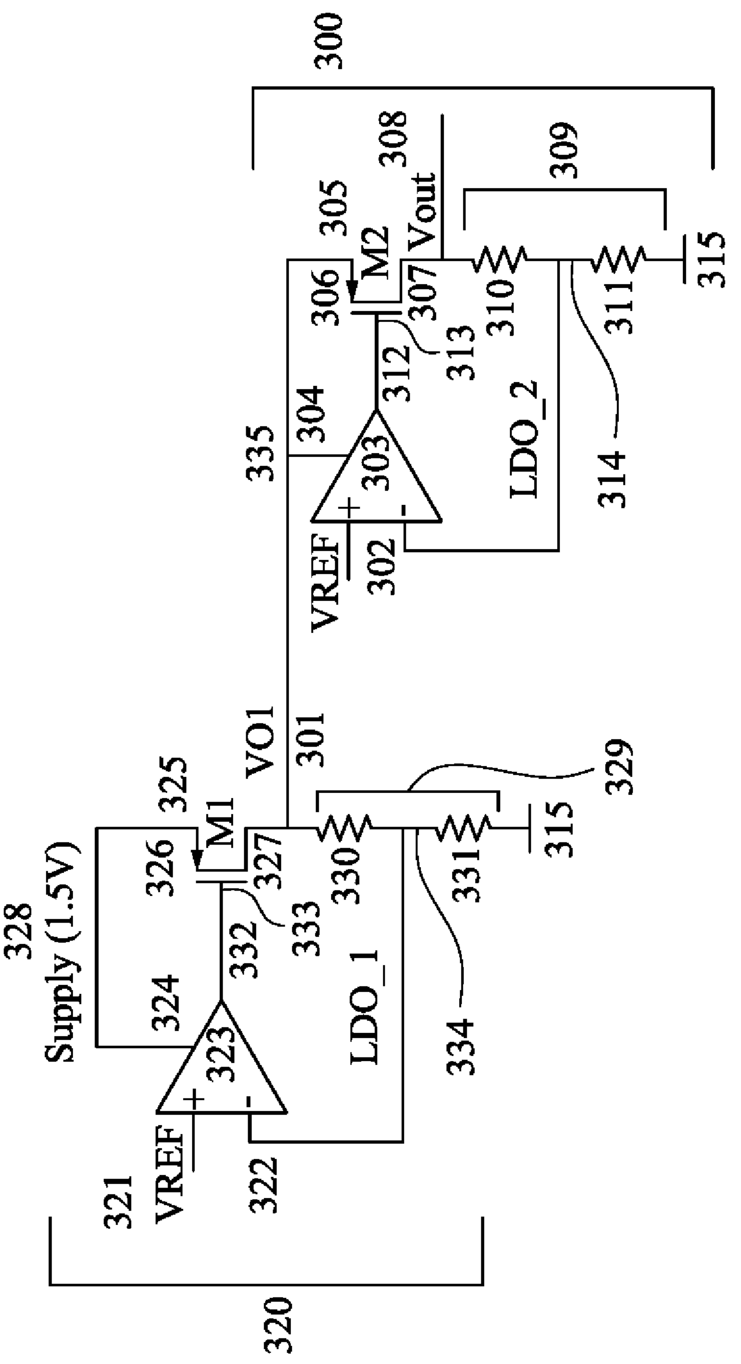
FIG. 3 depicts a schematic of a circuit for stepping down a voltage in two stages, illustrating both stages as LDOs at a component level, in accordance with some embodiments.

FIG. 3 depicts a schematic of a circuit for stepping down a voltage 328 in two stages, with both stages implemented as LDOs, in accordance with some embodiments. A first stage LDO 320 steps down the voltage 328 using an operational amplifier 323 and a transistor 325, and a second stage 300 steps down an intermediate voltage 335 again to a desired output voltage 308, in accordance with some embodiments. In some embodiments, the first stage 320 receives the input supply voltage 328 and a reference voltage 321 as inputs.

A transistor 325 receives the input supply voltage 328. In some embodiments, the transistor 325 is a PMOS transistor with a supply 326 electrically coupled to the input supply voltage 328, a gate 333 electrically coupled to a control signal 332 output by the operational amplifier 323, and drain 327, which outputs the intermediate stepdown voltage 335.

The operational amplifier 323 receives a high voltage rail input 324 electrically coupled to the input voltage 328. The operational amplifier 323 receives a reference voltage 321 as an input and a feedback input 322 proportionately related to the intermediate stepdown voltage 335. In some embodiments, the feedback input 322 is electrically coupled to a divided voltage output 334 of a voltage divider 329 that includes resistors 330, 331, which has the intermediate stepdown voltage 335 as a high voltage input and a ground 315 as a low voltage input. The operational amplifier 323 uses these inputs and the feedback voltage 322 to control the intermediate stepdown voltage 335.

The operational amplifier 323 outputs a control signal 332 based on the voltages it received as inputs (reference voltage 321 and feedback input 322) to step down the intermediate stepdown voltage 335 to a desired level. The control signal 332 is electrically coupled to the gate 333 of the transistor 325 to control the intermediate stepdown voltage 335. In some embodiments, the intermediate stepdown voltage 335 is stepped down to a level relatively close to the desired target output voltage 308, which can provide better device performance and longevity. In some embodiments, the intermediate stepdown voltage 335 is targeted to be 0.1 volts to 0.2 volts greater than the desired target output voltage 308.

In some embodiments, the second stage 300 is an LDO, as depicted in FIG. 3, with the intermediate stepdown voltage 335 and second stage reference voltage 301 as inputs and the desired target output voltage 308 as the output. In some embodiments, the second stage LDO 300 has an operational amplifier 303, and a transistor 305. In some embodiments, the second stage 300 also has a voltage divider 309 that includes resistors 310, 311. In some embodiments, the transistor 305 is a PMOS transistor with a source 306, a gate 313, and a drain 307. The transistor 305 receives the intermediate stepdown voltage 335 and outputs the desired target output voltage 308. The gate 313 of transistor 305 is electrically coupled to an output 312 of the operational amplifier 303 to control a voltage level of the target desired output voltage 308. In some embodiments, in which transistor 305 is a PMOS transistor, the intermediate stepdown voltage 335 is electrically coupled to the source terminal 306 and the desired target output voltage 308 is electrically coupled to drain terminal 307.

The operational amplifier 303 receives a high voltage rail input 304 electrically coupled to the intermediate stepdown voltage 335. The operational amplifier 303 receives a reference voltage 301 as an input and a feedback input 302 proportionately related to the desired target output voltage 308. In some embodiments, the feedback input 302 is electrically coupled to a divided voltage output 314 of a voltage divider 309, which has the desired target output voltage 308 as a high voltage input and a ground 315 as a low voltage input. The operational amplifier 303 uses these inputs and the feedback voltage 302 to control the desired target voltage 308 of the circuit.

In some embodiments, an equivalent reference voltage may be used as the reference voltage 321 of the operational amplifier 323 of the first stage LDO 320 and as the reference voltage 301 of the operational amplifier 303 of the second stage LDO 300. In an example embodiment, the supply voltage 328 may be 1.5 volts, which is regulated to 1.0 volts as the intermediate stepdown voltage 335, which in turn may be further regulated to 0.9 volts as the target output voltage 308. In this example embodiment, the circuit can have a capacitive load of ~ 100 picofarads at a load current of 10 milliamps.

FIG. 4a depicts an example performance of the two-stage LDO circuit of FIG. 3 stepping down a supply voltage input of 1.5 volts to a desired output 402 of 0.9 volts by first stepping the supply voltage input down to an intermediate stepdown voltage 401 at a value of 1.0 volts, which is within the desired 0.2 volts range of the desired output voltage, as previously described in accordance with some embodiments on a voltage graph 400.

FIG. 4b depicts an example power supply rejection ratio (PSRR) performance the two-stage LDO circuit of FIG. 3 stepping down a supply voltage input to a desired output across a range of frequencies, in accordance with some embodiments. A PSRR graph 410 indicates that for this circuit, PSRR holds constant at −81 dB until it begins to climb quickly at an inflection point between 10 MHz and 100 mHz. The graph 410 shows the wide range of frequencies over which a two-stage LDO circuit maintains a constant PSRR at a low level below-80 db.

FIG. 4c depicts an example PSRR performance of a single-stage LDO circuit 420 stepping down a supply voltage input to a desired output at 1 KHz and 10 MHz in comparison to the performance of a two-stage LDO 423 at the same data points, in accordance with some embodiments. The two-stage LDO 423 is shown to have an advantage in its PSRR performance at 1 KHz, with a value of −81 db in comparison to the single-stage LDO 420, which has a PSRR of −69 db at 1 kHz, as well as at 10 MHz, at which the two-level LDO 423 has a PSRR 425 that remained relatively constant at −80 db, while the single-stage LDO 420 had its PSRR 422 drop significantly to −55 db. This comparison demonstrates that multi-stage LDO circuits have a greater and more consistent PSRR than a comparable single-stage LDO circuit over the same range of frequencies.

Figure 5:
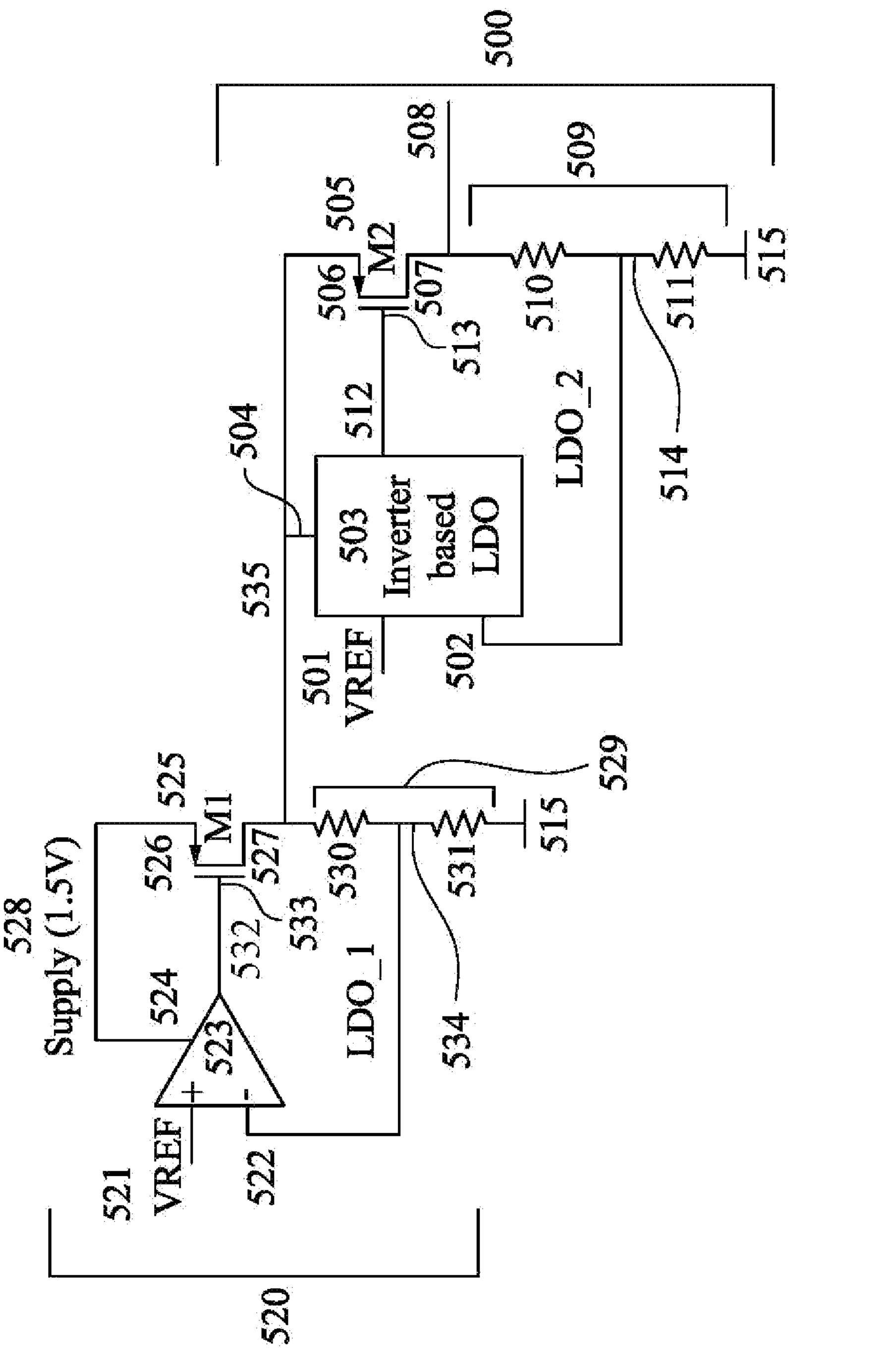
FIG. 5 depicts a schematic diagram of a two stage LDO circuit implemented with an inverter based LDO in the second stage, in accordance with some embodiments.

FIG. 5 depicts a schematic diagram of a two stage LDO circuit implemented with an inverter based LDO 503 in a second stage 500, in accordance with some embodiments. FIG. 5 depicts a schematic of a circuit for stepping down a voltage 528 in two stages, with both stages implemented as LDOs, in accordance with some embodiments. A first stage LDO 520 steps down the voltage 528 using an operational amplifier 523 and a transistor 525, and a second stage 500 steps down an intermediate voltage 535 again to a desired output voltage 508, in accordance with some embodiments. In some embodiments, the first stage 520 receives the input supply voltage 528 and a reference voltage 521 as inputs.

A transistor 525 receives the input supply voltage 528. In some embodiments, the transistor 525 is a PMOS transistor with a supply 526 electrically coupled to the input supply voltage 528, a gate 533 electrically coupled to a control signal 532 output by the operational amplifier 523, and drain 527, which outputs the intermediate stepdown voltage 535.

The operational amplifier 523 receives a high voltage rail input 524 electrically coupled to the input voltage 528. The operational amplifier 523 receives a reference voltage 521 as an input and a feedback input 522 proportionately related to the intermediate stepdown voltage 535. In some embodiments, the feedback input 522 is electrically coupled to a divided voltage output 534 of a voltage divider 529, which includes resistors 530, 531 and has the intermediate stepdown voltage 535 as a high voltage input and a ground 515 as a low voltage input. The operational amplifier 523 uses these inputs and the feedback voltage 522 to control the intermediate stepdown voltage 535.

The operational amplifier 523 outputs a control signal 532 based on the voltages it received as inputs (reference voltage 521 and feedback input 522) to step down the intermediate stepdown voltage 535 to a desired level. The control signal 532 is electrically coupled to the gate 533 of the transistor 525 to control the intermediate stepdown voltage 535. In some embodiments, the intermediate stepdown voltage 535 is stepped down to a level relatively close to the desired target output voltage 508, which can provide better device performance and longevity. In some embodiments, the intermediate stepdown voltage 535 is targeted to be 0.1 volts to 0.2 volts greater than the desired target output voltage 508.

In some embodiments, the second stage 500 is comprised of an inverter based LDO 503, as depicted in FIG. 5, with the intermediate stepdown voltage 535 and second stage reference voltage 501 as inputs and the desired target output voltage 508 as the output. In some embodiments, the second stage LDO 500 has an inverter based LDO 503, and a transistor 505. In some embodiments, the second stage 500 also has a voltage divider 509 that has resistors 510, 511. In some embodiments, the transistor 505 is a PMOS transistor with a source 506, a gate 513, and a drain 507. The transistor 505 receives the intermediate stepdown voltage 535 and outputs the desired target output voltage 508. The gate 513 of transistor 505 is electrically coupled to an output 512 of the inverter based LDO 503 to control a voltage level of the target desired output voltage 508. In some embodiments, in which transistor 505 is a PMOS transistor, the intermediate stepdown voltage 535 is electrically coupled to the source terminal 506 and the desired target output voltage 508 is electrically coupled to drain terminal 507.

The inverter based LDO 503 receives a high voltage rail input 504 electrically coupled to the intermediate stepdown voltage 535. The inverter based LDO 503 receives a reference voltage 501 as an input and a feedback input 502 proportionately related to the desired target output voltage 508. In some embodiments, the feedback input 502 is electrically coupled to a divided voltage output 514 of a voltage divider 509, which has the desired target output voltage 508 as a high voltage input and a ground 515 as a low voltage input. The inverter based LDO 503 uses these inputs and the feedback voltage 502 to control the desired target voltage 508 of the circuit.

When an inverter based LDO is used at high voltages (e.g. 1.2 volts), the inverter based LDO circuit has a very large quiescent current. The quiescent current of the inverter based LDO circuit may be significantly reduced by using a multi-level LDO as described herein. In an example embodiment, the supply voltage 528 may be 1.5 volts, which is regulated to an intermediate regulated voltage 535 of 1.0 volts by the first stage 520. In turn, the intermediate regulated voltage 535 may then be regulated to 0.9 volts using the inverter based LDO 503 of the second stage 500.

Figure 6A:
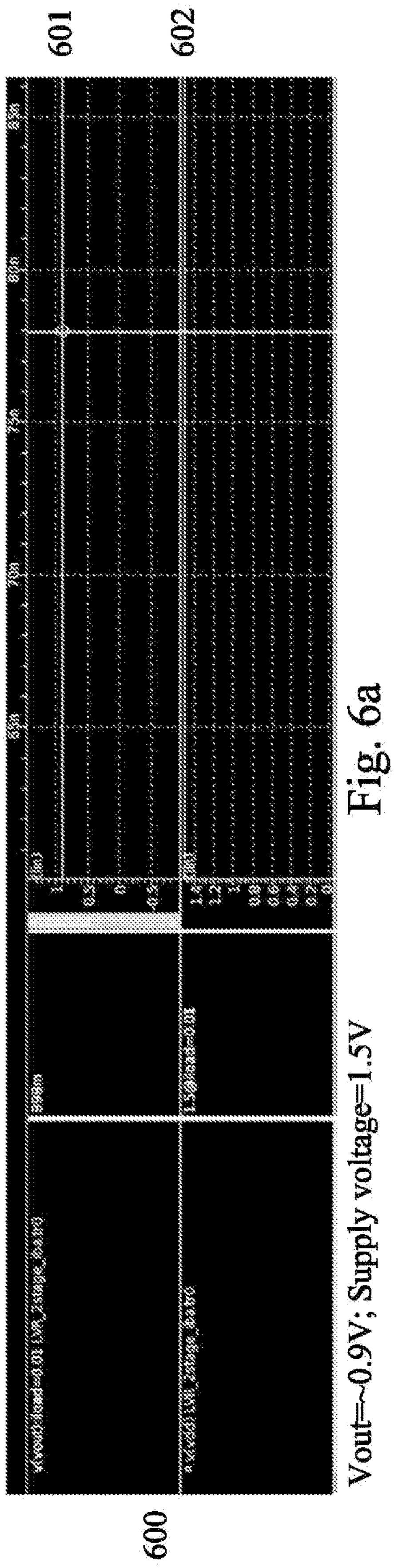
FIG. 6*a* depicts an example performance of an LDO circuit stepping down an input voltage to a target voltage, in accordance with some embodiments.

FIG. 6a depicts a voltage graph 600 showing an example performance of the two-stage LDO circuit of FIG. 5 stepping down a supply voltage 602 of 1.5 volts to a target output voltage 601 of 0.9 volts, in accordance with some embodiments.

Figure 6B:
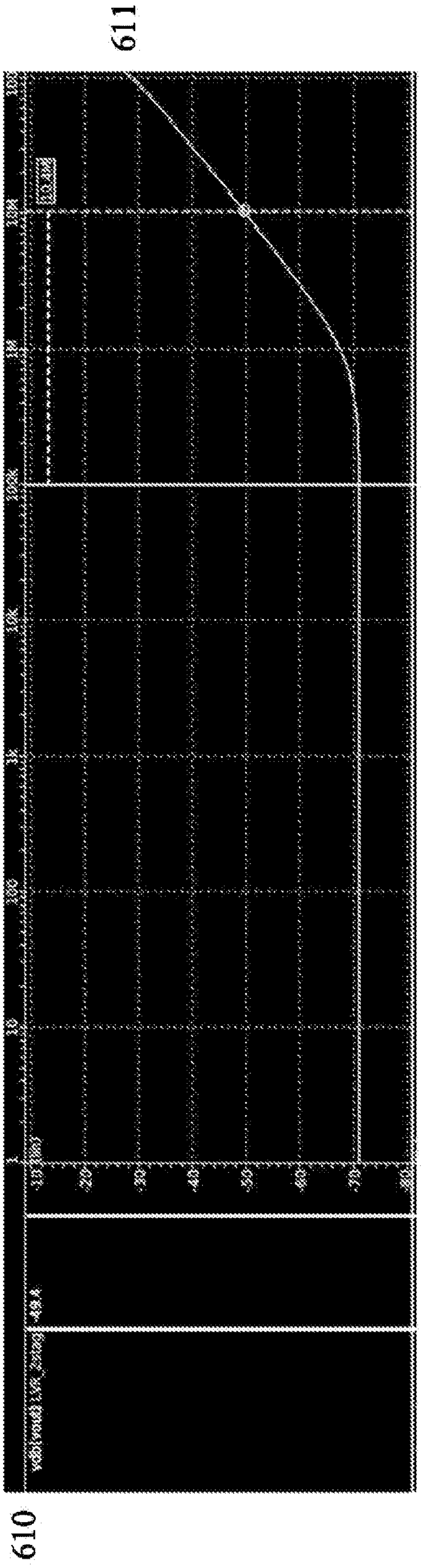
FIG. 6*b* depicts an example PSRR performance of an LDO circuit stepping down an input voltage to a target voltage across a range of frequencies, in accordance with some embodiments.

FIG. 6b depicts an example PSRR graph 610 showing performance of the two-stage LDO circuit of FIG. 5 stepping down an input voltage to a target voltage across a range of frequencies from 100 kHz to 100 Mhz, in accordance with some embodiments. The PSRR graph 610 shows that a PSRR 611 of the two-stage LDO circuit of FIG. 5 remains stable at −71 dB from 100 kHz until an inflection point between 100 kHz and 1 MHz, where the PSRR 611 begins to significantly decrease in magnitude, falling to −50 db at 10 MHz.

Figure 7:
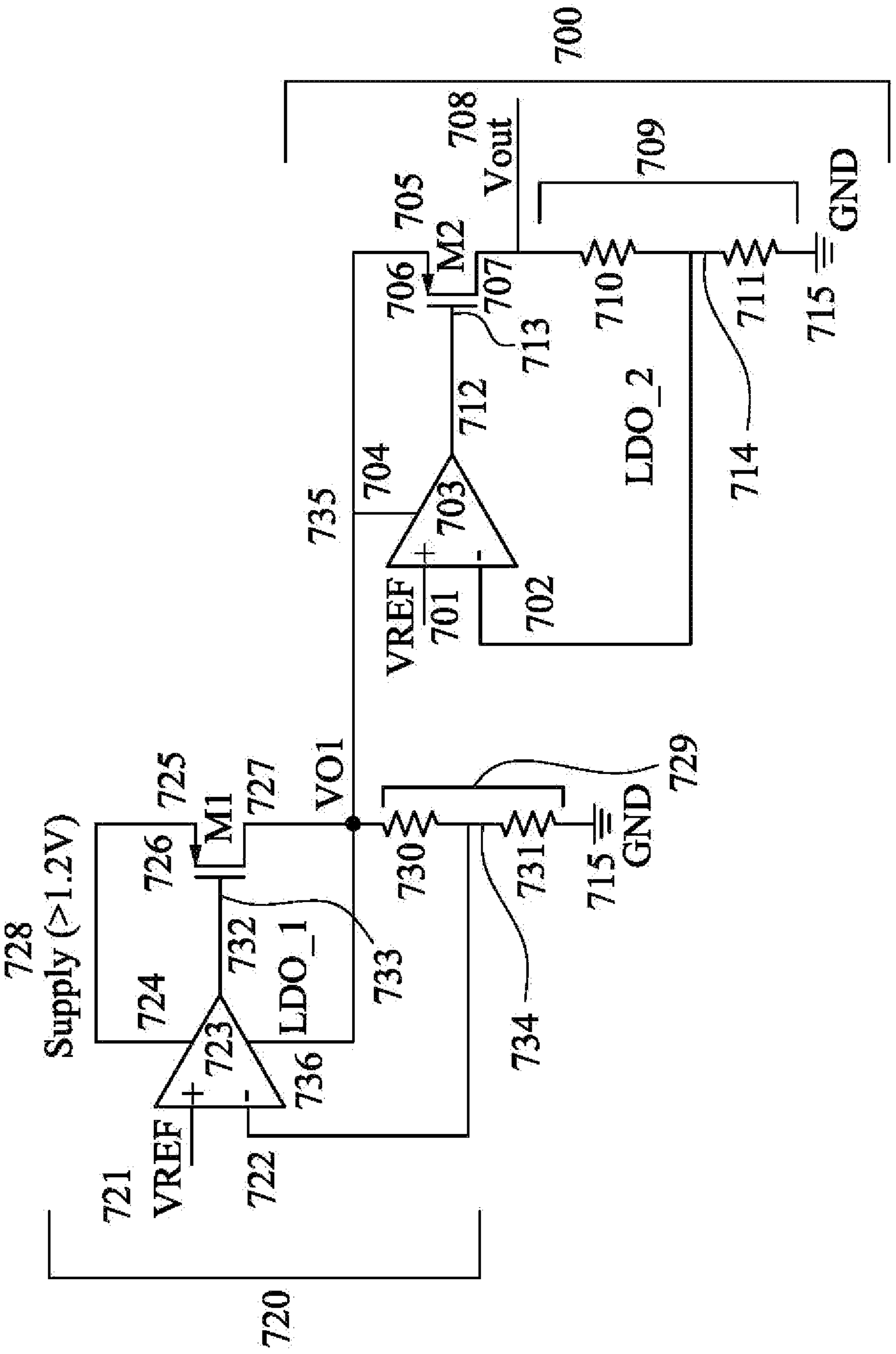
FIG. 7 depicts a schematic diagram of a two stage LDO, wherein an intermediate stepped down voltage is used as a low voltage rail for a first stage LDO, in accordance with some embodiments.

FIG. 7 depicts a schematic diagram of a two stage LDO, wherein an intermediate stepped down voltage is used as a low voltage rail for a first stage LDO, in accordance with some embodiments. FIG. 7 depicts a schematic of a circuit for stepping down a voltage 728 in two stages, with both stages implemented as LDOs, in accordance with some embodiments. A first stage LDO 720 steps down the voltage 728 using an operational amplifier 723 and a transistor 725, and a second stage 700 steps down an intermediate voltage 735 again to a desired output voltage 708, in accordance with some embodiments. In some embodiments, the first stage 720 receives the input supply voltage 728 and a reference voltage 721 as inputs.

A transistor 725 receives the input supply voltage 728. In some embodiments, the transistor 725 is a PMOS transistor with a supply 726 electrically coupled to the input supply voltage 728, a gate 733 electrically coupled to a control signal 732 output by the operational amplifier 723, and drain 727, which outputs the intermediate stepdown voltage 735.

The operational amplifier 723 receives a high voltage rail input 724 electrically coupled to the input voltage 728 and a low voltage rail input 736 electrically coupled to the intermediate stepdown voltage 735. This reduces the rail-to-rail voltage for the operational amplifier 723, which has the effect of helping to avoid high voltage issues, which could consequently result in increased reliability of the operational amplifier 723 with less device burnout and a greater device lifespan. Additionally, the operational amplifier 723 is made up of a number of PMOS and NMOS transistors, which may be fabricated using a deep N-well process to isolate the components and provide better reliability. The operational amplifier 723 receives a reference voltage 721 as an input and a feedback input 722 proportionately related to the intermediate stepdown voltage 735. In some embodiments, the feedback input 722 is electrically coupled to a divided voltage output 734 of a voltage divider 729, which includes resistors 730, 731 has the intermediate stepdown voltage 735 as a high voltage input and a ground 715 as a low voltage input. The operational amplifier 723 uses these inputs and the feedback voltage 722 to control the intermediate stepdown voltage 735.

The operational amplifier 723 outputs a control signal 732 based on the voltages it received as inputs (reference voltage 721 and feedback input 722) to step down the intermediate stepdown voltage 735 to a desired level. The control signal 732 is electrically coupled to the gate 733 of the transistor 725 to control the intermediate stepdown voltage 735. In some embodiments, the intermediate stepdown voltage 735 is stepped down to a level relatively close to the desired target output voltage 708, which can provide better device performance and longevity. In some embodiments, the intermediate stepdown voltage 735 is targeted to be 0.1 volts to 0.2 volts greater than the desired target output voltage 708.

In some embodiments, the second stage 700 is an LDO, as depicted in FIG. 7, with the intermediate stepdown voltage 735 and second stage reference voltage 701 as inputs and the desired target output voltage 708 as the output. In some embodiments, the second stage LDO 700 has an operational amplifier 703, and a transistor 705. In some embodiments, the second stage 700 also has a voltage divider 709 that includes resistors 710, 711. In some embodiments, the transistor 705 is a PMOS transistor with a source 706, a gate 713, and a drain 707. The transistor 705 receives the intermediate stepdown voltage 735 and outputs the desired target output voltage 708. The gate 713 of transistor 705 is electrically coupled to an output 712 of the operational amplifier 703 to control a voltage level of the target desired output voltage 708. In some embodiments, in which transistor 705 is a PMOS transistor, the intermediate stepdown voltage 735 is electrically coupled to the source terminal 706 and the desired target output voltage 708 is electrically coupled to drain terminal 707.

The operational amplifier 703 receives a high voltage rail input 704 electrically coupled to the intermediate stepdown voltage 735. The operational amplifier 703 receives a reference voltage 701 as an input and a feedback input 702 proportionately related to the desired target output voltage 708. In some embodiments, the feedback input 702 is electrically coupled to a divided voltage output 714 of a voltage divider 709, which has the desired target output voltage 708 as a high voltage input and a ground 715 as a low voltage input. The operational amplifier 703 uses these inputs and the feedback voltage 702 to control the desired target voltage 708 of the circuit.

Figure 8B:
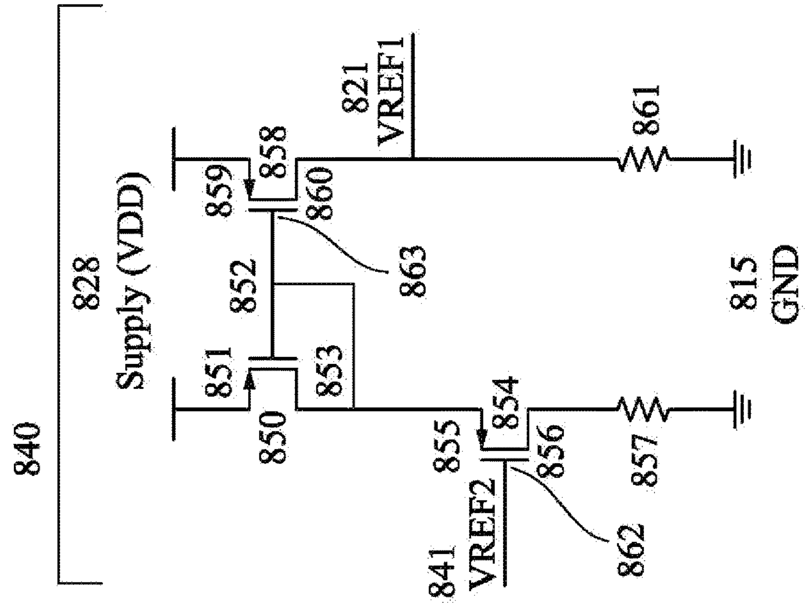
FIG. 8*b* depicts a schematic diagram of a reference voltage generator to generate a reference voltage for a two stage LDO, in accordance with some embodiments.
Figure 8A:
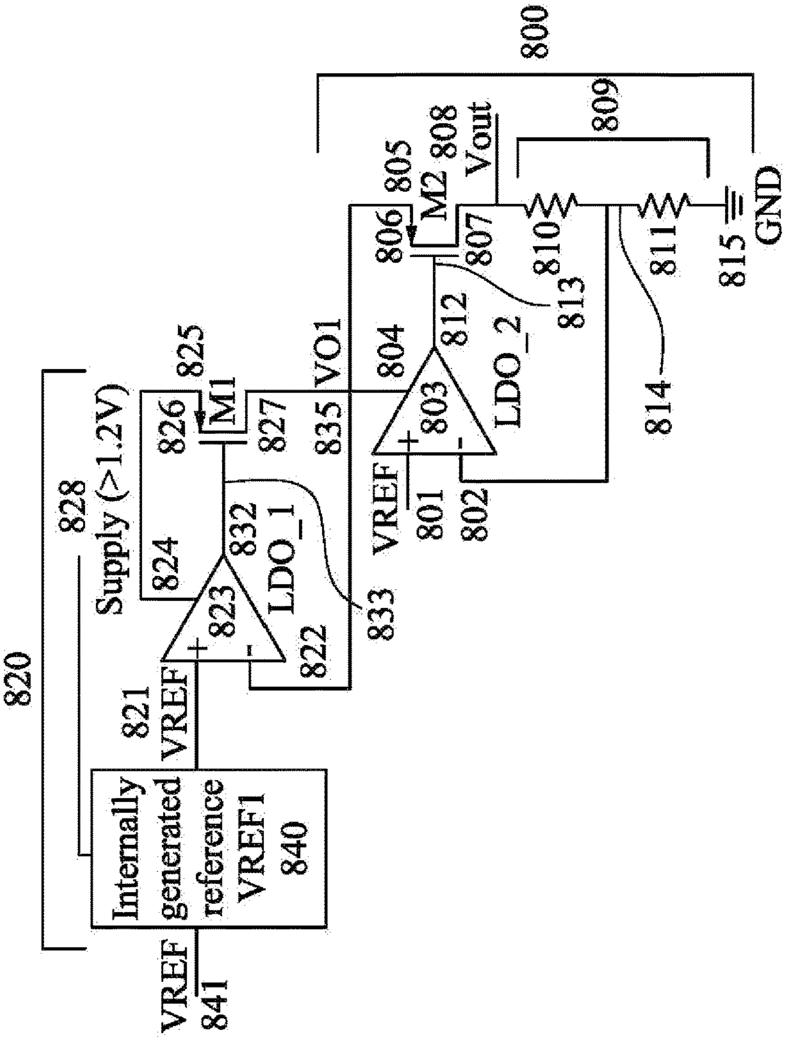
FIG. 8*a* depicts a schematic diagram of a two stage LDO, wherein a first stage is implemented with an internal reference voltage generator and a feedback input to the first stage electrically coupled directly to an intermediate stepped down voltage of the first stage, in accordance with some embodiments.

FIG. 8*a* depicts a schematic diagram of a two stage LDO circuit, wherein a first stage 820 is implemented with an internal reference voltage generator 840 and a feedback input 822 to the first stage electrically coupled directly to an intermediate stepped down voltage 835 of the first stage 820, in accordance with some embodiments. FIG. 8*a* depicts a schematic of a circuit for stepping down a voltage 828 in two stages, with both stages implemented as LDOs, in accordance with some embodiments. A first stage LDO 820 steps down the voltage 828 using an operational amplifier 823 and a transistor 825, and a second stage 800 steps down an intermediate stepped down voltage 835 again to a desired output voltage 808, in accordance with some embodiments. In some embodiments, the first stage 820 receives the input supply voltage 828 and a reference voltage 821 as inputs. In some embodiments, the reference voltage 821 is internally generated by an internal reference voltage generator 840. The internal reference voltage generator 840 receives an input reference signal 841 and the supply voltage 828 and outputs the reference voltage 821 as an input to the operational amplifier 823.

A transistor 825 receives the input supply voltage 828. In some embodiments, the transistor 825 is a PMOS transistor with a supply 826 electrically coupled to the input supply voltage 828, a gate 833 electrically coupled to a control signal 832 output by the operational amplifier 823, and drain 827, which outputs the intermediate stepdown voltage 835.

The operational amplifier 823 receives a high voltage rail input 824 electrically coupled to the input voltage 828. The operational amplifier 823 receives a reference voltage 821 as an input and a feedback input 822. In some embodiments, the feedback input 822 is electrically coupled to the intermediate stepdown voltage 835. The operational amplifier 823 uses these inputs and the feedback voltage 822 to control the intermediate stepdown voltage 835.

The operational amplifier 823 outputs a control signal 832 based on the voltages it received as inputs (reference voltage 821 and feedback input 822) to step down the intermediate stepdown voltage 835 to a desired level. The control signal 832 is electrically coupled to the gate 833 of the transistor 825 to control the intermediate stepdown voltage 835. In some embodiments, the intermediate stepdown voltage 835 is stepped down to a level relatively close to the desired target output voltage 808, which can provide better device performance and longevity. In some embodiments, the intermediate stepdown voltage 835 is targeted to be 0.1 volts to 0.2 volts greater than the desired target output voltage 808.

In some embodiments, the second stage 800 is an LDO, as depicted in FIG. 8*a*, with the intermediate stepdown voltage 835 and second stage reference voltage 801 as inputs and the desired target output voltage 808 as the output. In some embodiments, the second stage LDO 800 has an operational amplifier 803, and a transistor 805. In some embodiments, the second stage 800 also has a voltage divider 809 that includes resistors 810, 811. In some embodiments, the transistor 805 is a PMOS transistor with a source 806, a gate 813, and a drain 807. The transistor 805 receives the intermediate stepdown voltage 835 and outputs the desired target output voltage 808. The gate 813 of transistor 805 is electrically coupled to an output 812 of the operational amplifier 803 to control a voltage level of the desired target output voltage 808. In some embodiments, in which transistor 805 is a PMOS transistor, the intermediate stepdown voltage 835 is electrically coupled to the source terminal 806 and the desired target output voltage 808 is electrically coupled to drain terminal 807.

The operational amplifier 803 receives a high voltage rail input 804 electrically coupled to the intermediate stepdown voltage 835. The operational amplifier 803 receives a reference voltage 801 as an input and a feedback input 802 proportionately related to the desired target output voltage 808. In some embodiments, the feedback input 802 is electrically coupled to a divided voltage output 814 of a voltage divider 809, which has the desired target output voltage 808 as a high voltage input and a ground 815 as a low voltage input. The operational amplifier 803 uses these inputs and the feedback voltage 802 to control the desired target voltage 808 of the circuit.

FIG. 8*b* depicts a schematic diagram of a reference voltage generator 840 to generate a reference voltage 821 for the first stage LDO 820 of a multi-stage LDO, in accordance with some embodiments. The reference voltage generator 840 enables control over the value of the reference voltage 821 input into the operational amplifier 823, as in FIG. 8*a*, independently from the voltage of the input reference signal 841 by selecting the resistance of resistor 861.

Reference voltage generator 840 is comprised of a MOS diode 850 with a first terminal 851 receiving the supply voltage 828 and a second terminal 853, which is electrically coupled to a gate terminal 852 of the MOS diode 850. In some embodiments. MOS diode 850 is a PMOS transistor with a source terminal 851 and a drain terminal 853. The second terminal 853 is electrically coupled to a source terminal of a PMOS transistor 854, which receives the input reference signal 841 at a gate terminal 862 and has a drain terminal 856 electrically coupled to ground 815 through a resistor 857. The gate terminal 852 is electrically coupled to a transistor 858 at a gate terminal 863. The transistor 858 has a first terminal 859 electrically coupled to the supply voltage 828 and a second terminal 860, which outputs reference voltage 821 to operational amplifier 823 and is electrically coupled to ground through the resistor 861. In some embodiments, transistor 858 is a PMOS transistor with source terminal 859 and drain terminal 860.

When the input reference signal 841 is high, PMOS transistor 854 turns off, leaving the voltage of the drain 853 and gate 852 high of MOS diode 850 high. While the value of gate terminal 852 is high, the gate terminal 863 remains high, resulting in PMOS transistor 858 being turned off. While transistor 858 is off, the reference voltage 821 is pulled down to 0 volts through the resistor 861. When the input reference signal 841 is low, PMOS transistor 854 is turned on, which lowers the voltage of drain terminal 853 of the MOS diode 850. Consequently, this lowers the voltage of gate terminal 863 of PMOS transistor 858, which turns transistor 858 on and allows current to flow from drain terminal 860 of PMOS transistor 858 through the resistor 861 and into ground 815, which increases the voltage of the reference voltage 821 to the value of the current passing through resistor 861 multiplied by the resistance of resistor 861.

Figure 9:
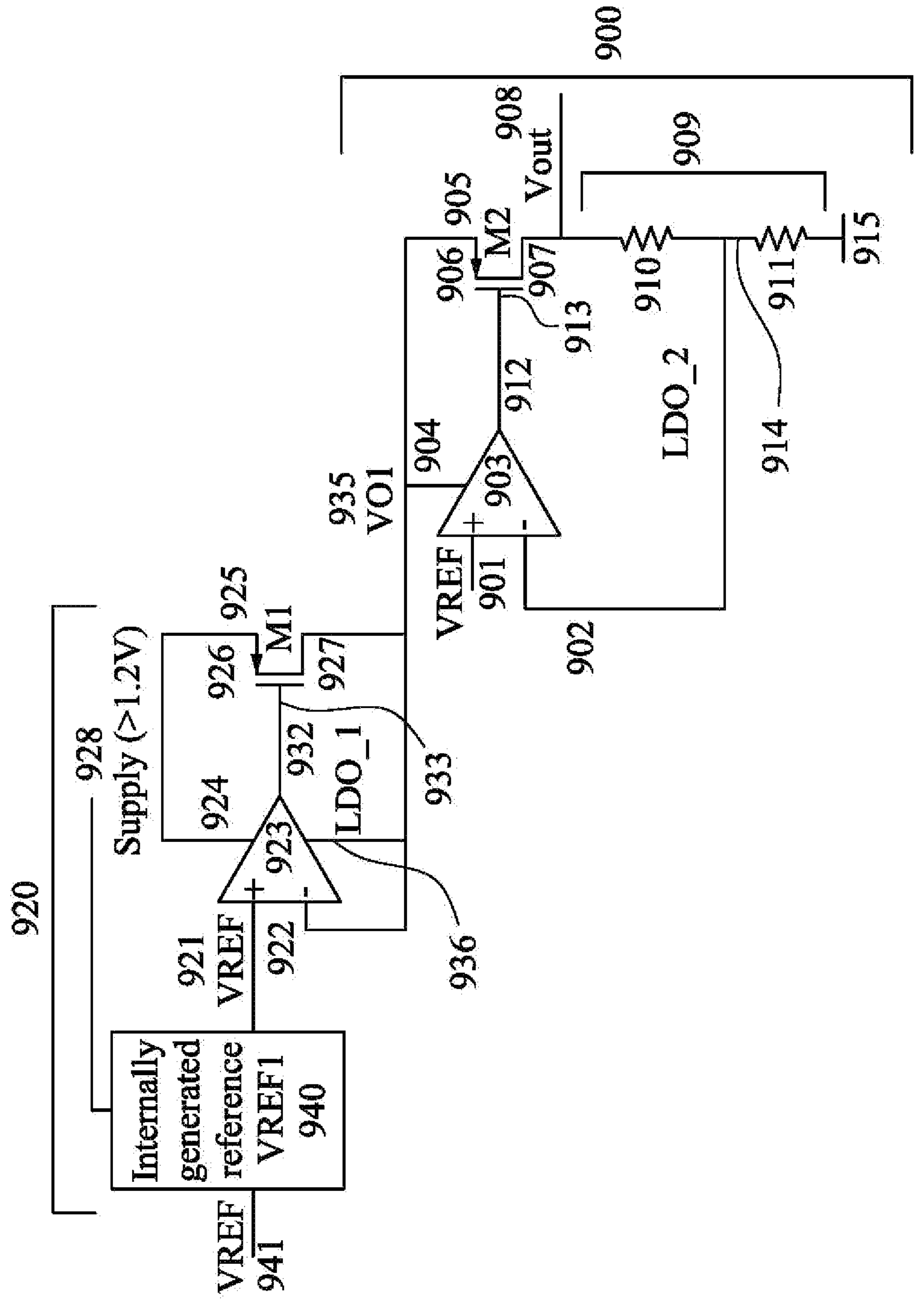
FIG. 9 depicts a schematic diagram of a two stage LDO with a first stage implemented with an internal reference voltage generator and both a feedback input and a low voltage rail electrically coupled directly to an intermediate stepped down voltage of the first stage, in accordance with some embodiments.

FIG. 9 depicts a schematic diagram of a two stage LDO with a first stage LDO 920 implemented with an internal reference voltage generator 940 and both a feedback input 922 and low voltage rail 936 electrically coupled directly to an intermediate stepped down voltage 935 of the first stage LDO 920, in accordance with some embodiments. FIG. 9 depicts a schematic of a circuit for stepping down a voltage 928 in two stages, with both stages implemented as LDOs, in accordance with some embodiments. A first stage LDO 920 steps down the voltage 928 using an operational amplifier 923 and a transistor 925, and a second stage 900 steps down an intermediate stepped down voltage 935 again to a desired output voltage 908, in accordance with some embodiments. In some embodiments, the first stage 920 receives the input supply voltage 928 and a reference voltage 921 as inputs. In some embodiments, the reference voltage 921 is internally generated by an internal reference voltage generator 940. The internal reference voltage generator 940 receives an input reference signal 941 and the supply voltage 928 and outputs the reference voltage 921 as an input to the operational amplifier 923.

A transistor 925 receives the input supply voltage 928. In some embodiments, the transistor 925 is a PMOS transistor with a supply 926 electrically coupled to the input supply voltage 928, a gate 933 electrically coupled to a control signal 932 output by the operational amplifier 923, and drain 927, which outputs the intermediate stepdown voltage 935.

The operational amplifier 923 receives a high voltage rail input 924 electrically coupled to the input voltage 928 and a low voltage rail input 936 electrically coupled to the intermediate stepdown voltage 935. This reduces the rail-to-rail voltage for the operational amplifier 923, which has the effect of helping to avoid high voltage issues, which could consequently result in increased reliability of the operational amplifier 923 with less device burnout and a greater device lifespan. Additionally, the operational amplifier 923 is made up of a number of PMOS and NMOS transistors, which may be fabricated using a deep N-well on substrate process to isolate the components and provide better reliability. The operational amplifier 923 receives a reference voltage 921 as an input and a feedback input 922 proportionately related to the intermediate stepdown voltage 935. The operational amplifier 923 uses these inputs and the feedback voltage 922 to control the intermediate stepdown voltage 935.

The operational amplifier 923 receives a high voltage rail input 924 electrically coupled to the input voltage 928. The operational amplifier 923 receives a reference voltage 921 as an input and a feedback input 922. In some embodiments, the feedback input 922 is electrically coupled to the intermediate stepdown voltage 935. The operational amplifier 923 uses these inputs and the feedback voltage 922 to control the intermediate stepdown voltage 935.

The operational amplifier 923 outputs a control signal 932 based on the voltages it received as inputs (reference voltage 921 and feedback input 922) to step down the intermediate stepdown voltage 935 to a desired level. The control signal 932 is electrically coupled to the gate 933 of the transistor 925 to control the intermediate stepdown voltage 935. In some embodiments, the intermediate stepdown voltage 935 is stepped down to a level relatively close to the desired target output voltage 908, which can provide better device performance and longevity. In some embodiments, the intermediate stepdown voltage 935 is targeted to be 0.1 volts to 0.2 volts greater than the desired target output voltage 908.

In some embodiments, the second stage 900 is an LDO, as depicted in FIG. 9, with the intermediate stepdown voltage 935 and second stage reference voltage 901 as inputs and the desired target output voltage 908 as the output. In some embodiments, the second stage LDO 900 has an operational amplifier 903, and a transistor 905. In some embodiments, the second stage 900 also has a voltage divider 909 that has resistors 910, 911. In some embodiments, the transistor 905 is a PMOS transistor with a source 906, a gate 913, and a drain 907. The transistor 905 receives the intermediate stepdown voltage 935 and outputs the desired target output voltage 908. The gate 913 of transistor 905 is electrically coupled to an output 912 of the operational amplifier 903 to control a voltage level of the desired target output voltage 908. In some embodiments, in which transistor 905 is a PMOS transistor, the intermediate stepdown voltage 935 is electrically coupled to the source terminal 906 and the desired target output voltage 908 is electrically coupled to drain terminal 907.

The operational amplifier 903 receives a high voltage rail input 904 electrically coupled to the intermediate stepdown voltage 935. The operational amplifier 903 receives a reference voltage 901 as an input and a feedback input 902 proportionately related to the desired target output voltage 908. In some embodiments, the feedback input 902 is electrically coupled to a divided voltage output 914 of a voltage divider 909, which has the desired target output voltage 908 as a high voltage input and a ground 915 as a low voltage input. The operational amplifier 903 uses these inputs and the feedback voltage 902 to control the desired target output voltage 908 of the circuit.

Figure 10:
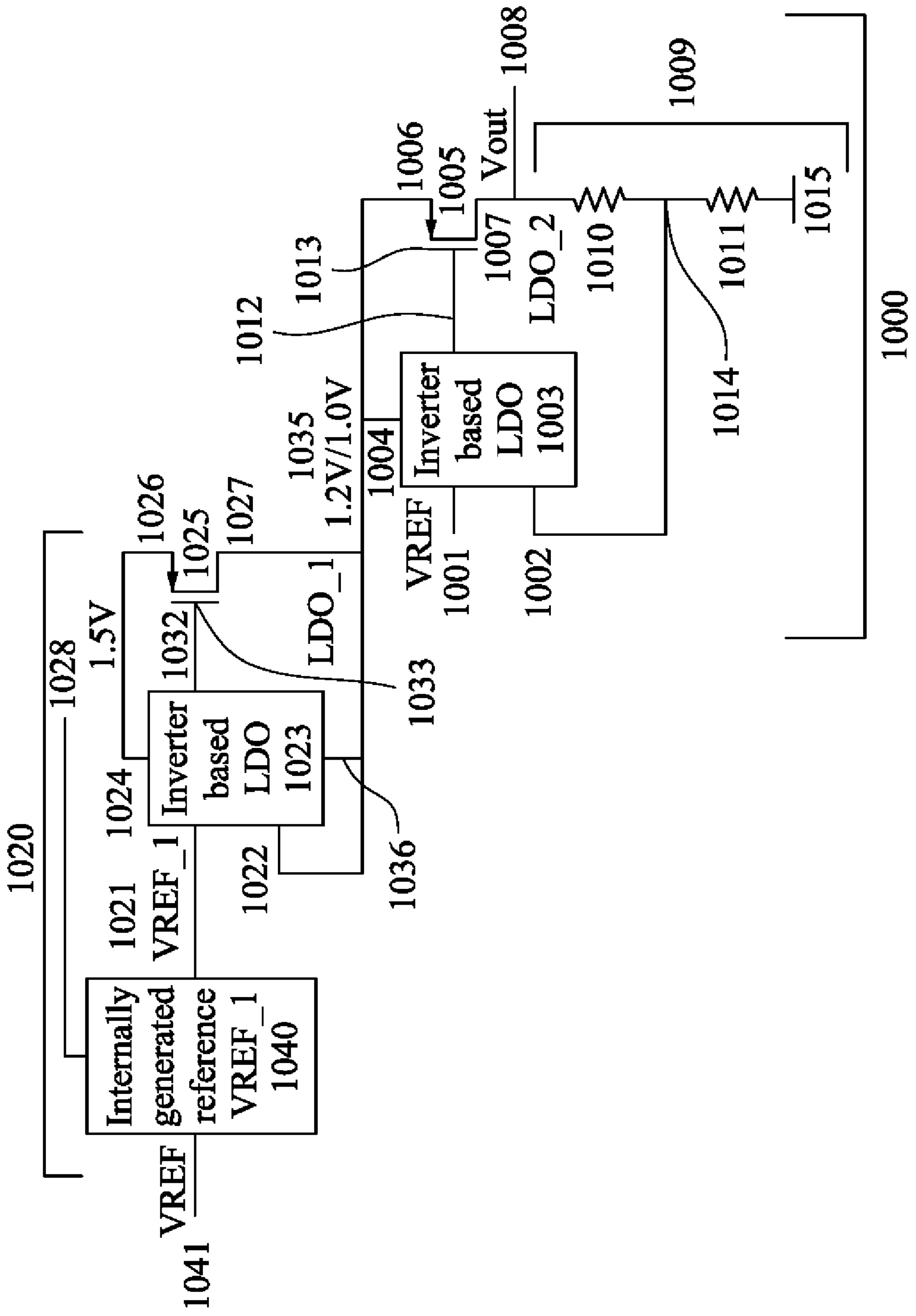
FIG. 10 depicts a schematic diagram of a two stage LDO with both stages implemented with inverter based LDOs, in accordance with some embodiments.

FIG. 10 depicts a schematic diagram of a two stage LDO with both stages implemented with inverter based LDOs (1023 and 1003), in accordance with some embodiments. The two stage LDO circuit comprises a first stage LDO 1020 implemented with an internal reference voltage generator 1040 and both a feedback input 1022 and a low voltage rail 1036 electrically coupled directly to an intermediate stepped down voltage 1035 of the first stage LDO 1020, in accordance with some embodiments. FIG. 10 depicts a schematic of a circuit for stepping down a voltage 1028 in two stages, with both stages implemented with inverter based LDOs (1023 and 1003), in accordance with some embodiments. A first stage LDO 1020 steps down the voltage 1028 using an inverter based LDO 1023 and a transistor 1025, and a second stage 1000 steps down an intermediate stepped down voltage 1035 again to a desired output voltage 1008, in accordance with some embodiments. In some embodiments, the first stage 1020 receives the input supply voltage 1028 and a reference voltage 1021 as inputs. In some embodiments, the reference voltage 1021 is internally generated by an internal reference voltage generator 1040. The internal reference voltage generator 1040 receives an input reference signal 1041 and the supply voltage 1028 and outputs the reference voltage 1021 as an input to the inverter based LDO 1023.

A transistor 1025 receives the input supply voltage 1028. In some embodiments, the transistor 1025 is a PMOS transistor with a supply 1026 electrically coupled to the input supply voltage 1028, a gate 1033 electrically coupled to a control signal 1032 output by the inverter based LDO 1023, and drain 1027, which outputs the intermediate stepdown voltage 1035.

The inverter based LDO 1023 receives a high voltage rail input 1024 electrically coupled to the input voltage 1028 and a low voltage rail input 1036 electrically coupled to the intermediate stepdown voltage 1035. This reduces the rail-to-rail voltage for the inverter based LDO 1023, which has the effect of helping to avoid high voltage issues, which could consequently result in increased reliability of the inverter based LDO 1023 with less device burnout and a greater device lifespan. Additionally, the inverter based LDO 1023 is made up of a number of PMOS and NMOS transistors, which may be fabricated using a deep N-well on substrate process to isolate the components and provide better reliability. The inverter based LDO 1023 receives a reference voltage 1021 as an input and a feedback input 1022 proportionately related to the intermediate stepdown voltage 1035. The inverter based LDO 1023 uses these inputs and the feedback voltage 1022 to control the intermediate stepdown voltage 1035.

The inverter based LDO 1023 receives a high voltage rail input 1024 electrically coupled to the input voltage 1028. The inverter based LDO 1023 receives a reference voltage 1021 as an input and a feedback input 1022. In some embodiments, the feedback input 1022 is electrically coupled to the intermediate stepdown voltage 1035. The inverter based LDO 1023 uses these inputs and the feedback voltage 1022 to control the intermediate stepdown voltage 1035.

The inverter based LDO 1023 outputs a control signal 1032 based on the voltages it received as inputs (reference voltage 1021 and feedback input 1022) to step down the intermediate stepdown voltage 1035 to a desired level. The control signal 1032 is electrically coupled to the gate 1033 of the transistor 1025 to control the intermediate stepdown voltage 1035. In some embodiments, the intermediate stepdown voltage 1035 is stepped down to a level relatively close to the desired target output voltage 1008, which can provide better device performance and longevity. In some embodiments, the intermediate stepdown voltage 1035 is targeted to be 0.1 volts to 0.2 volts greater than the desired target output voltage 1008.

In some embodiments, the second stage 1000 is an LDO, as depicted in FIG. 10, with the intermediate stepdown voltage 1035 and second stage reference voltage 1001 as inputs and the desired target output voltage 1008 as the output. In some embodiments, the second stage LDO 1000 has an inverter based LDO 1003, and a transistor 1005. In some embodiments, the second stage 1000 also has a voltage divider 1009 that includes resistors 1010, 1011. In some embodiments, the transistor 1005 is a PMOS transistor with a source 1006, a gate 1013, and a drain 1007. The transistor 1005 receives the intermediate stepdown voltage 1035 and outputs the desired target output voltage 1008. The gate 1013 of transistor 1005 is electrically coupled to an output 1012 of the inverter based LDO 1003 to control a voltage level of the target desired output voltage 1008. In some embodiments, in which transistor 1005 is a PMOS transistor, the intermediate stepdown voltage 1035 is electrically coupled to the source terminal 1006 and the desired target output voltage 1008 is electrically coupled to drain terminal 1007.

The inverter based LDO 1003 receives a high voltage rail input 1004 electrically coupled to the intermediate stepdown voltage 1035. The inverter based LDO 1003 receives a reference voltage 1001 as an input and a feedback input

1002 proportionately related to the desired target output voltage 1008. In some embodiments, the feedback input 1002 is electrically coupled to a divided voltage output 1014 of a voltage divider 1009, which has the desired target output voltage 1008 as a high voltage input and a ground 1015 as a low voltage input. The inverter based LDO 1003 uses these inputs and the feedback voltage 1002 to control the desired target voltage 1008 of the circuit.

Figure 11:
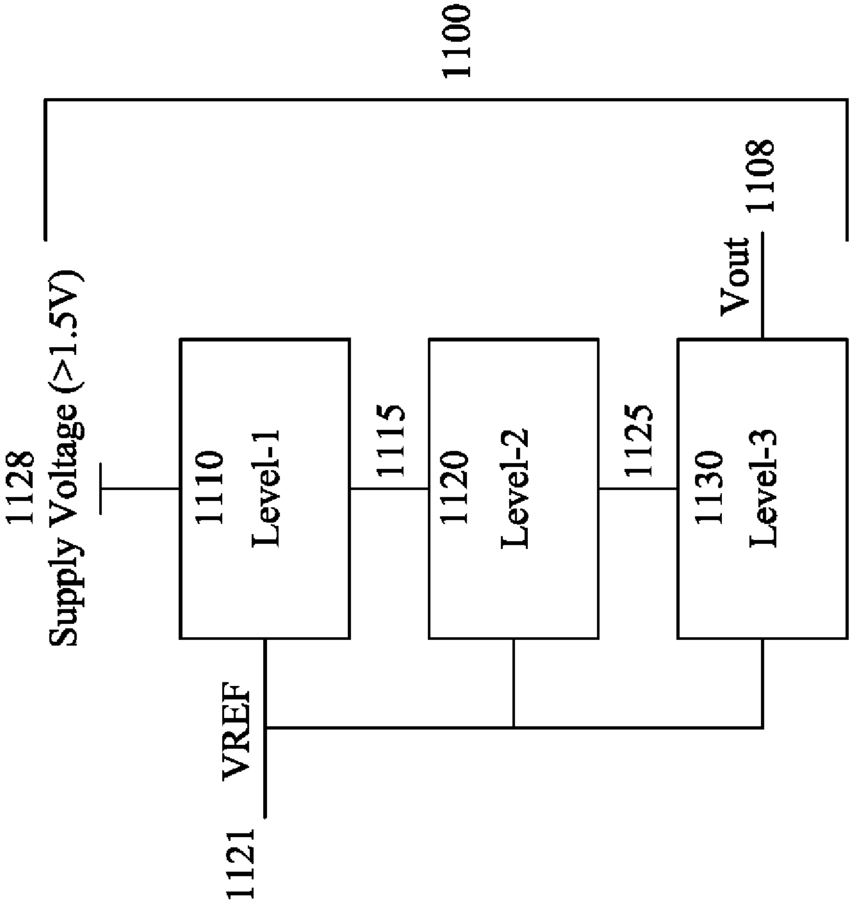
FIG. 11 depicts a multi-stage LDO with three voltage level stepdowns, in accordance with some embodiments.

FIG. 11 depicts a multi-stage LDO circuit 1100 with three voltage level step-downs, in accordance with some embodiments. For large supply voltages of 1.8 volts or greater (e.g., 1.8 volts, 3.3 volts, etc.), one or more stages of LDOs may be added in a chain, with each level stepping down the voltage while maintaining that all voltage drops across any devices in circuit 1100 remains below 0.9 volts. Any combination of LDO levels as previously described may be implemented in this manner.

In an example embodiment depicted in FIG. 11, three LDO voltage stepdown levels (1110, 1120, and 1130) are electrically coupled in a chain to step down a supply voltage 1128 to a desired target output voltage 1108 with intermediate step-down voltages 1115 and 1125 between stages. A first level voltage stepdown LDO 1110 receives the supply voltage 1128 and outputs a first intermediate stepdown voltage 1115, which a second level voltage stepdown LDO 1120 receives as an input. A second intermediate stepdown voltage 1125 is output from the second level voltage stepdown LDO 1120, which a third level voltage stepdown LDO 1130 receives as an input. The third level voltage stepdown LDO 1130 outputs the desired target output voltage 1108. Each of the LDO voltage stepdown levels (1110, 1120 and 1130) also receive a reference voltage 1121 as an input.

Figure 12:
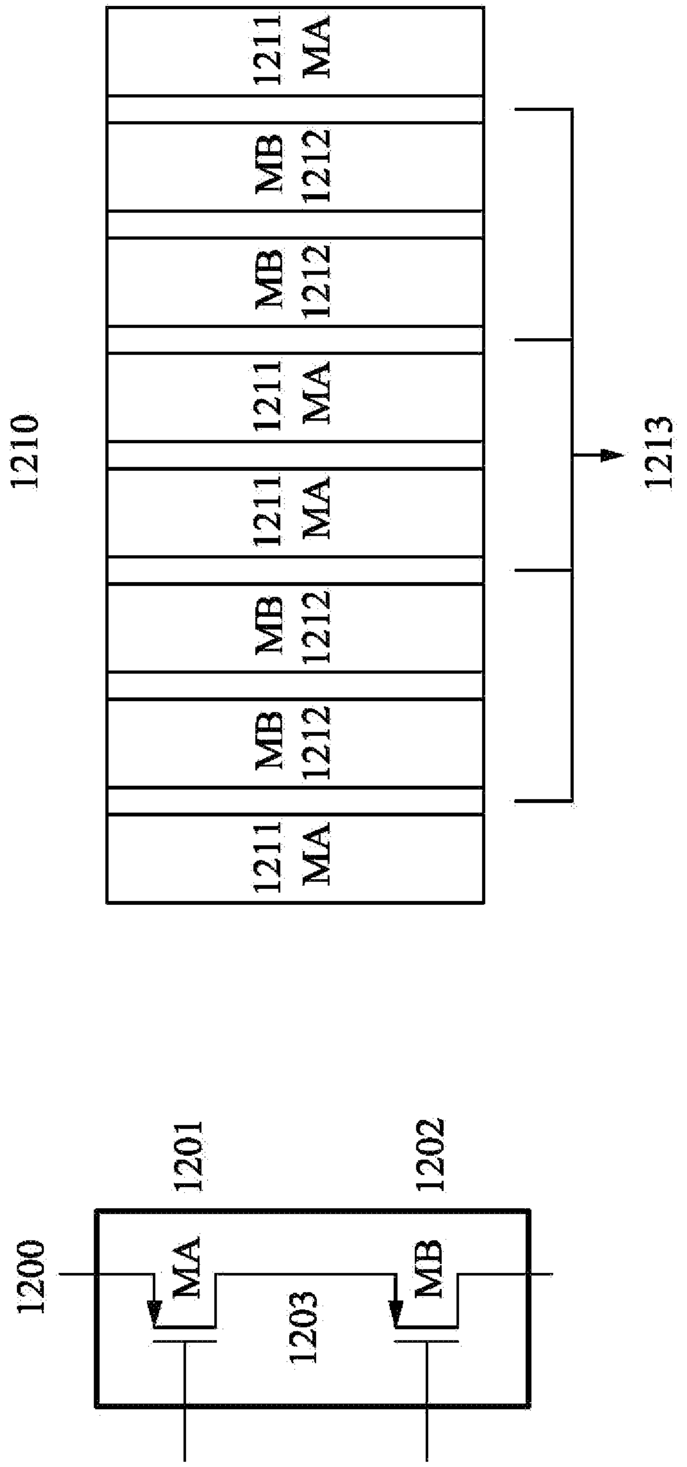
FIG. 12 depicts a shuffle layout for components of a two stage LDO in series on a substrate, in accordance with some embodiments.

FIG. 12 depicts a shuffle layout for large driver components of a multi-stage LDO in series on a substrate, in accordance with some embodiments. Circuit 1200 depicts a schematic of two large driver components (1201 and 1202) in series with each other, sharing a direct electric coupling 1203 such that a shuffle layout 1210 may be implemented when manufacturing the devices on a substrate. A shuffle layout alternates between terminals of the first large driver component 1211, corresponding to the component 1201 in circuit 1200, and terminals of the second driver component 1212, corresponding to the component 1202 in circuit 1200. The purpose of making use of this shuffle layout is that it mitigates the possibility of large temperature variations between components because their terminals are interspersed with and abut one another. Also, the shuffle layout 1210 eliminates the need for a metal connection to facilitate the electric coupling 1203. Instead, drain and source terminals of the two components electrically coupled to each other are in direct contact in the shuffle layout 1210 at junctions 1213. Eliminating a metal connection between components has the additional benefit of reducing resistance between components.

Figure 13:
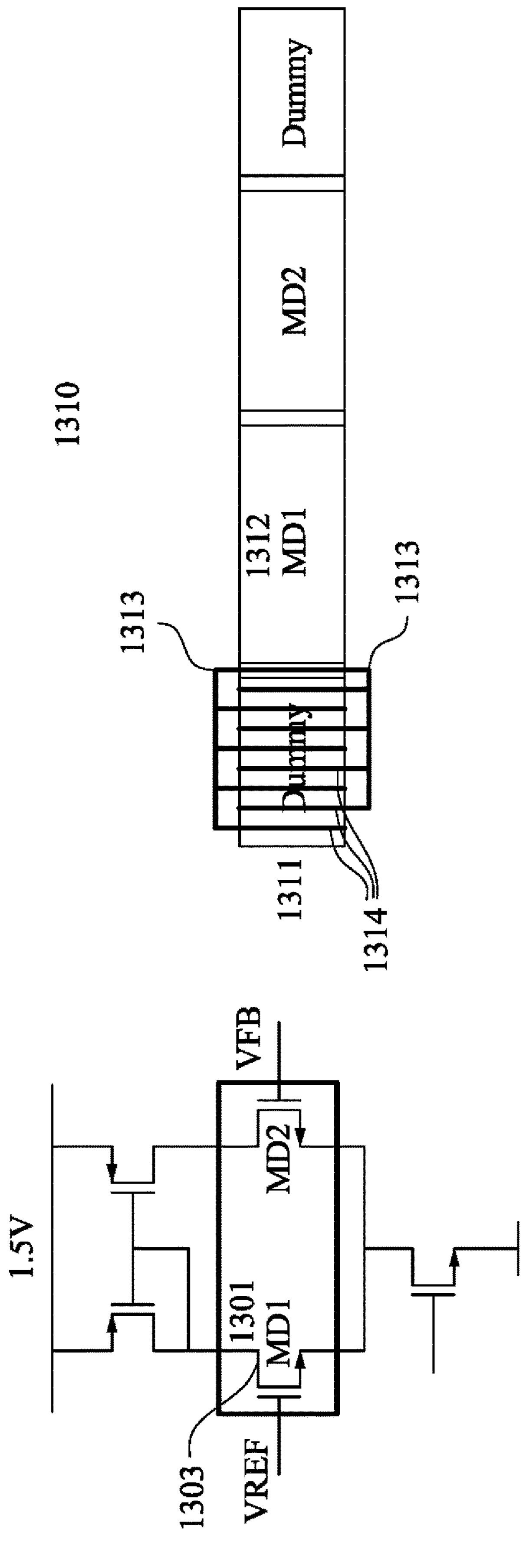
FIG. 13 depicts a layout pattern for components of a circuit containing dummy devices to increase reliability, in accordance with some embodiments.

FIG. 13 depicts a layout pattern for components of a circuit containing dummy devices to increase reliability, in accordance with some embodiments. Dummy devices are implemented next to active devices on a substrate to minimize the effect of process variation when manufacturing by ensuring consistent substrate doping in substrate around active devices. It is therefore important that current not leak into dummy devices, which must not be subjected to no greater voltage differences than active devices. Substrate layout pattern 1310 demonstrates a layout implementation to prevent dummy device breakdown for a dummy device 1311 sharing a terminal 1303 with an active transistor 1312, corresponding to transistor 1301 in circuit 1300. Dummy device 1311 is protected from large voltage drops across it when the terminal 1303 of transistor 1301 experiences a high voltage by electrically coupling all source, gate, and drain terminals 1314 of dummy device 1311 to a same terminal 1313, which corresponds to terminal 1303 in circuit 1300 such that there cannot be a voltage drop across the dummy device 1311 regardless of changes in the voltage of terminal 1303.

Figure 14:
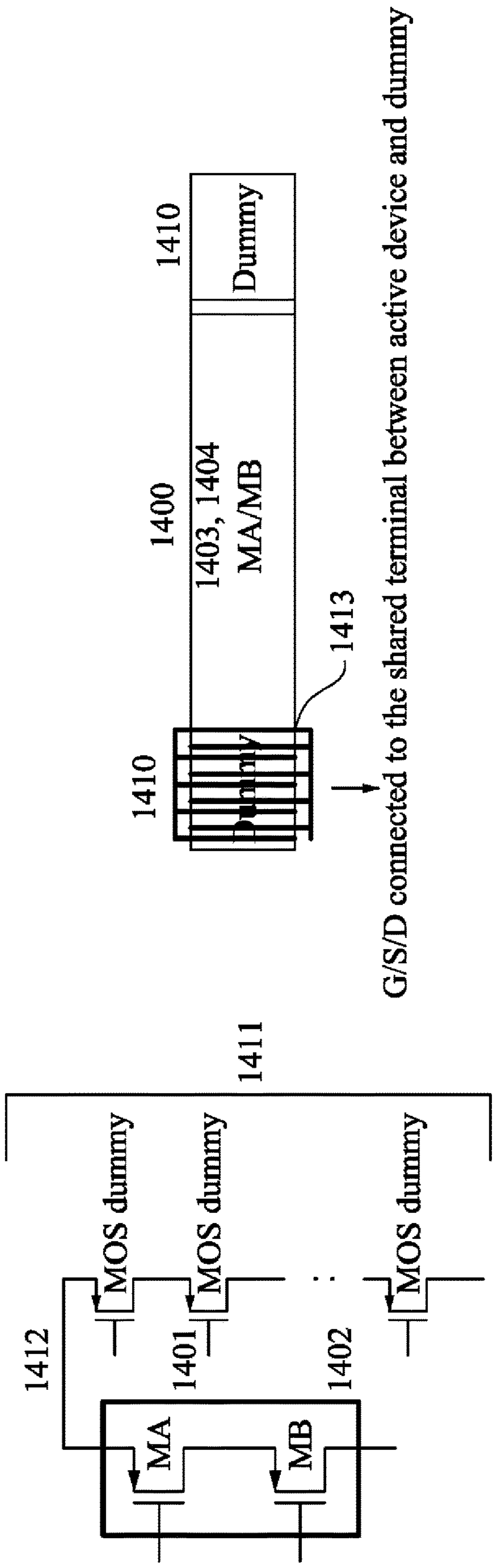
FIG. 14 depicts a layout pattern for driver MOS components containing dummy devices with all dummy terminals electrically coupled to a terminal shared with an active device to increase reliability and avoid high-voltage issues, in accordance with embodiments.

FIG. 14 depicts a layout pattern 1400 for driver MOS components 1403 and 1404 in layout 1400, which correspond respectively to MOS 1401 and 1402 containing dummy devices 1410, which correspond to MOS dummy devices 1411, with all dummy terminals electrically coupled to a terminal 1413 shared with an active device to increase reliability and avoid high-voltage issues, in accordance with some embodiments. When an active driver MOS 1401 has a terminal 1412 connected to a high voltage, adjacent dummy devices to the active driver MOS should have all of the terminals of the dummy devices connected to the terminal 1413 (corresponding to terminal 1412) shared by both the active device and dummy device to avoid high voltage issues caused by any floating terminals.

Figure 15:
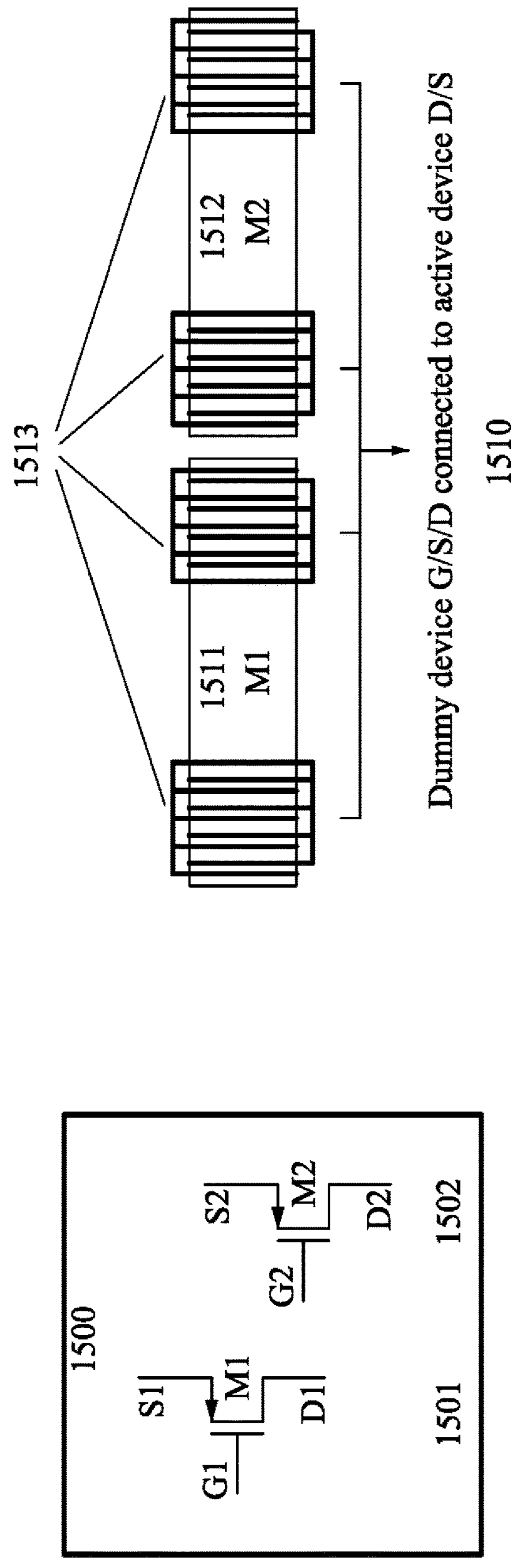
FIG. 15 depicts a layout pattern for components of a circuit containing dummy devices with a source, gate and drain terminals of each dummy device electrically coupled to corresponding terminals of a corresponding active device in accordance with embodiments.

FIG. 15 depicts a layout pattern 1510 for two active devices 1511 and 1512 with no common terminal, as shown by schematic 1500, depicting device 1501, which corresponds to device 1511, and device 1502, which corresponds to device 1512 on a shared diffusion layer in layout pattern 1510. To protect against high voltage issues in such a circumstance, each active device 1511 and 1512 should have a dummy device 1513 on each side, with a discontinuity between their closest dummy devices, as depicted in layout 1510 so as to not build up a voltage over abutting dummy components, which could suffer a breakdown current.

Figure 16:
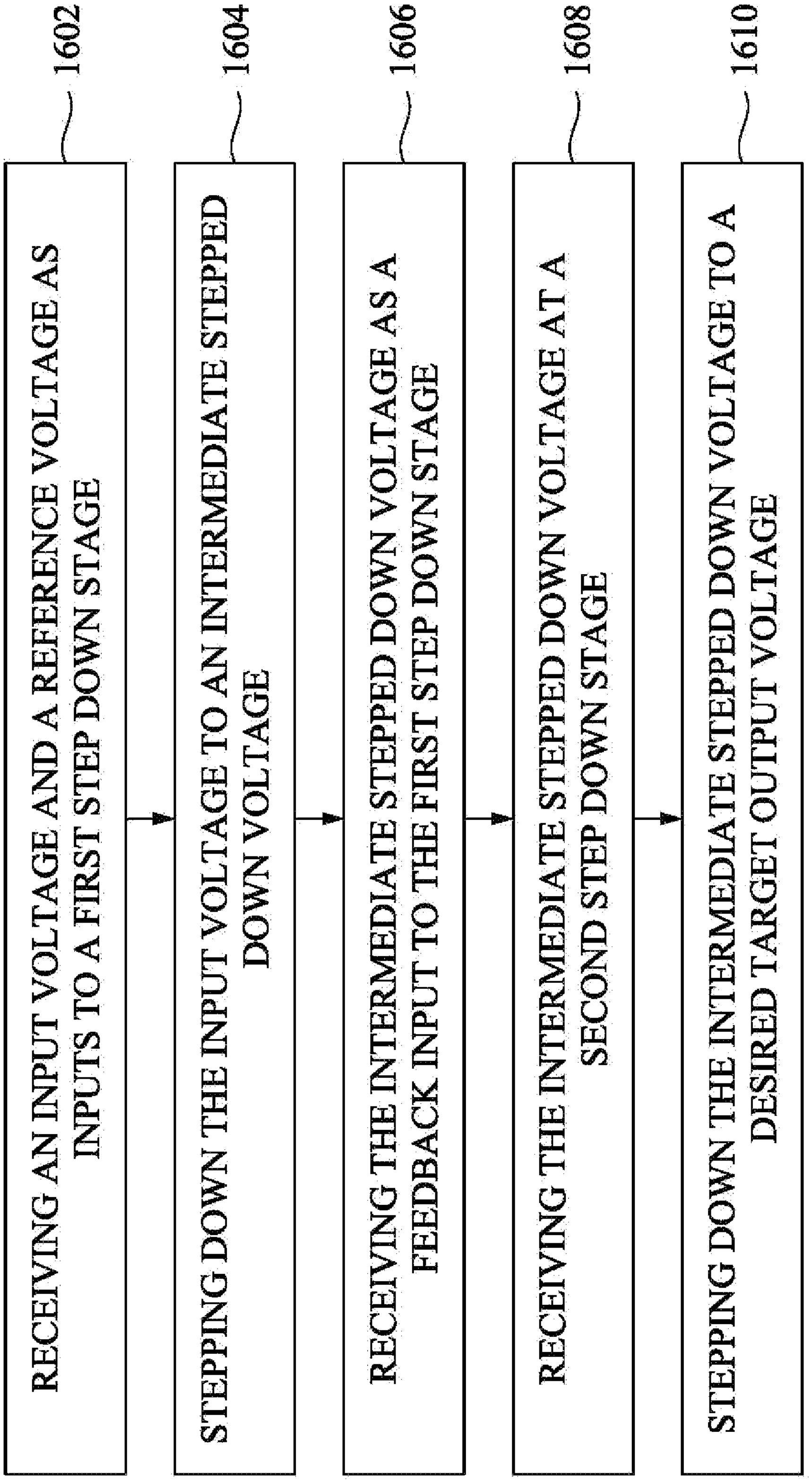
FIG. 16 is a flow diagram depicting a method of stepping down an input voltage to a desired target output voltage in accordance with some embodiments.

FIG. 16 is a flow diagram depicting a method of stepping down an input voltage to a desired target output voltage in accordance with some embodiments. At 1602, an input voltage and a reference voltage are received as inputs to a first step down stage. At 1604, the input voltage is stepped down to an intermediate stepped down voltage. At 1606, The intermediate stepped down voltage is received as a feedback input to the first step down stage. At 1608, the intermediate stepped down voltage is received at a second step down stage. At 1610, the intermediate stepped down voltage is stepped down to a desired target output voltage.

Systems and methods as described herein may take a variety of forms. In an example, a circuit includes a first voltage stepdown module and a second voltage stepdown module. The first voltage stepdown module has a supply voltage and a first reference voltage as inputs, and an intermediate stepped down voltage as an output, the intermediate stepped down voltage being electrically coupled to a feedback input of the first voltage stepdown module. The second voltage stepdown module includes a low-dropout voltage regulator having the intermediate stepped down voltage and a second reference voltage as inputs and a target voltage as an output.

In another example, a method for stepping down an input voltage to a desired target output at a lower voltage includes receiving an input voltage and a reference voltage as inputs to a first step down stage. The input voltage is stepped down to an intermediate stepped down voltage. The intermediate stepped down voltage is received as a feedback input to the first step down stage. The intermediate stepped down voltage is received at a second step down stage, and the intermediate stepped down voltage is further stepped down to a target output voltage.

In a further example, a circuit includes a voltage control unit having a supply voltage as an input and an intermediate stepped down voltage as a feedback input, the voltage control unit outputting a voltage control signal. A first stage transistor has the supply voltage as an input to a first terminal of the first stage transistor and outputs the intermediate stepped down voltage, the first stage transistor having a gate terminal electrically coupled to the voltage control signal. Further, a low dropout voltage regulator has the intermediate stepped down voltage as a first input and a reference voltage as a second input, the low dropout regulator outputting a target stepped down voltage.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A circuit comprising:

a first voltage stepdown module having an intermediate stepped down voltage as an output, the intermediate stepped down voltage being coupled to a low voltage rail input of the first voltage stepdown module, wherein the first voltage stepdown module includes a first operational amplifier having the low voltage rail input; and a second voltage stepdown module including a second operational amplifier having the intermediate stepped down voltage as an input.

2. The circuit of claim 1, wherein the first voltage stepdown module comprises a low-dropout voltage regulator having a supply voltage and a reference voltage as inputs and the intermediate stepped down voltage as an output.

3. The circuit of claim 1, wherein the first voltage stepdown module comprises multiple low-dropout voltage regulators in series, a supply voltage is an input to a first low-dropout voltage regulator, an output voltage of a last low-dropout voltage regulator is the intermediate stepped down voltage, and each low-dropout voltage regulator has a reference voltage as an input.

4. The circuit of claim 1, wherein:

the first voltage stepdown module comprises:

the first operational amplifier having a high voltage rail coupled to a supply voltage, a non-inverting input terminal coupled to a reference voltage, and an inverting input terminal coupled to a feedback signal; and a transistor having a first terminal coupled to the supply voltage, a gate terminal coupled to an output of the first operational amplifier, and a second terminal configured to output the intermediate stepped down voltage and coupled to a first terminal of a voltage divider;

a second terminal of the voltage divider is coupled to ground; and a midpoint terminal of the voltage divider is configured to output the feedback signal.

5. The circuit of claim 1, wherein the second voltage stepdown module further includes an output transistor having a first terminal coupled to the intermediate stepped down voltage.

6. The circuit of claim 1, wherein a low-dropout voltage regulator of the second voltage stepdown module is an inverter-based low-dropout voltage regulator.

7. The circuit of claim 1, further comprising an internal reference voltage generator having a reference voltage as an input and an internally generated reference voltage as an output, the internally generated reference voltage being an input to a low-dropout voltage regulator of the first voltage stepdown module, the low-dropout voltage regulator having a supply voltage as an input and the intermediate stepped down voltage as a feedback input.

8. The circuit of claim 7, wherein the intermediate stepped down voltage is the low voltage rail input to the low-dropout voltage regulator.

9. The circuit of claim 1, wherein a low-dropout voltage regulator of the first voltage stepdown module is implemented using an N-well on a substrate.

10. The circuit of claim 1, wherein a low-dropout voltage regulator of the first voltage stepdown module and a low-dropout voltage regulator of the second voltage stepdown module are inverter-based low-dropout voltage regulators.

11. The circuit of claim 10, wherein the inverter-based low-dropout voltage regulator of the first voltage stepdown module is implemented using an N-well on a substrate.

12. A method comprising:

receiving an intermediate stepped down voltage at a low voltage rail input of a first step down stage, wherein the first voltage stepdown module includes a first operational amplifier having the low voltage rail input; and receiving the intermediate stepped down voltage at a second operational amplifier of a second step down stage.

13. The method of claim 12, wherein the intermediate stepped down voltage is within 0.2 volts of a target output voltage.

14. The method of claim 12, further comprising:

generating an internal reference voltage based on a reference voltage; and using the internal reference voltage to generate the intermediate stepped down voltage.

15. The method of claim 12, further comprising stepping down an input voltage at least twice before stepping down to a target output voltage.

16. A circuit comprising:

a first stage transistor configured to output an intermediate stepped down voltage; and an output transistor having a first terminal coupled to the intermediate stepped down voltage, wherein the first stage transistor and the output transistor are implemented in a shuffle layout style on a substrate.

17. The circuit of claim 16, further comprising an operational amplifier configured to receive the intermediate stepped down voltage as a low voltage rail input, wherein a reference voltage is coupled to a non-inverting input of the operational amplifier.

18. The circuit of claim 16, further comprising a low-dropout voltage regulator including:

an operational amplifier having a high voltage rail terminal coupled to the intermediate stepped down voltage and configured to receive a voltage reference signal as an input, the operational amplifier configured to output an output transistor control signal; and a voltage divider having a first terminal coupled to a second terminal of the output transistor, a second terminal coupled to ground, and a midpoint terminal configured to output a feedback voltage signal, which is input to the operational amplifier.

19. The circuit of claim 18, wherein the output transistor further has a gate coupled to the output transistor control signal.

20. The circuit of claim 16, further comprising a number of active components and a number of dummy devices implemented next to the number of active components, wherein the number of dummy devices each comprise a gate, a source, and a drain coupled together.

* * * * *